July 6, 1937.　　S. L. C. COLEMAN　　2,085,738
VEHICLE SUSPENSION
Filed Oct. 11, 1935　　14 Sheets-Sheet 1
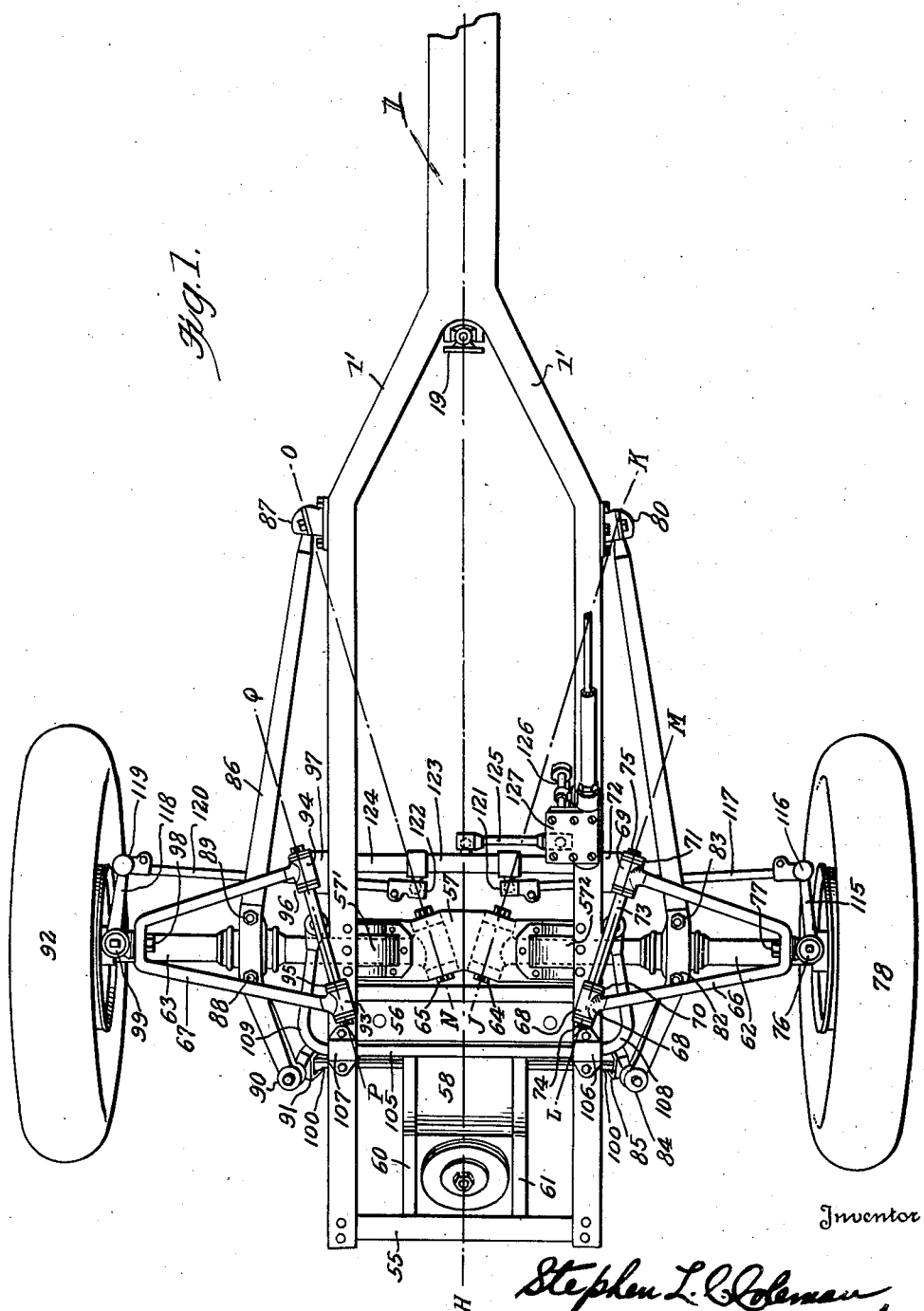
Inventor
Stephen L. C. Coleman,
By L. Clyde Grant,
Attorney

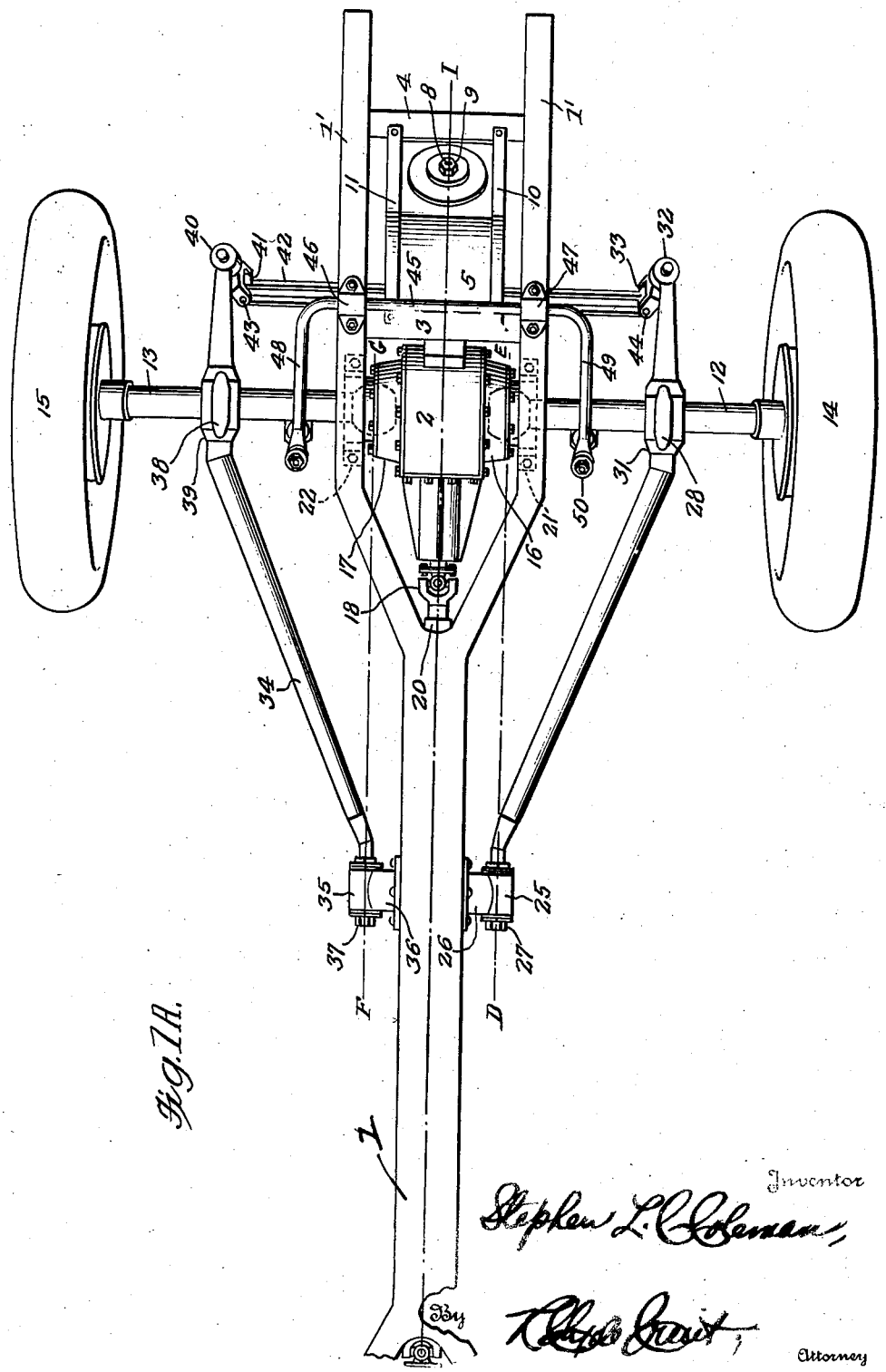

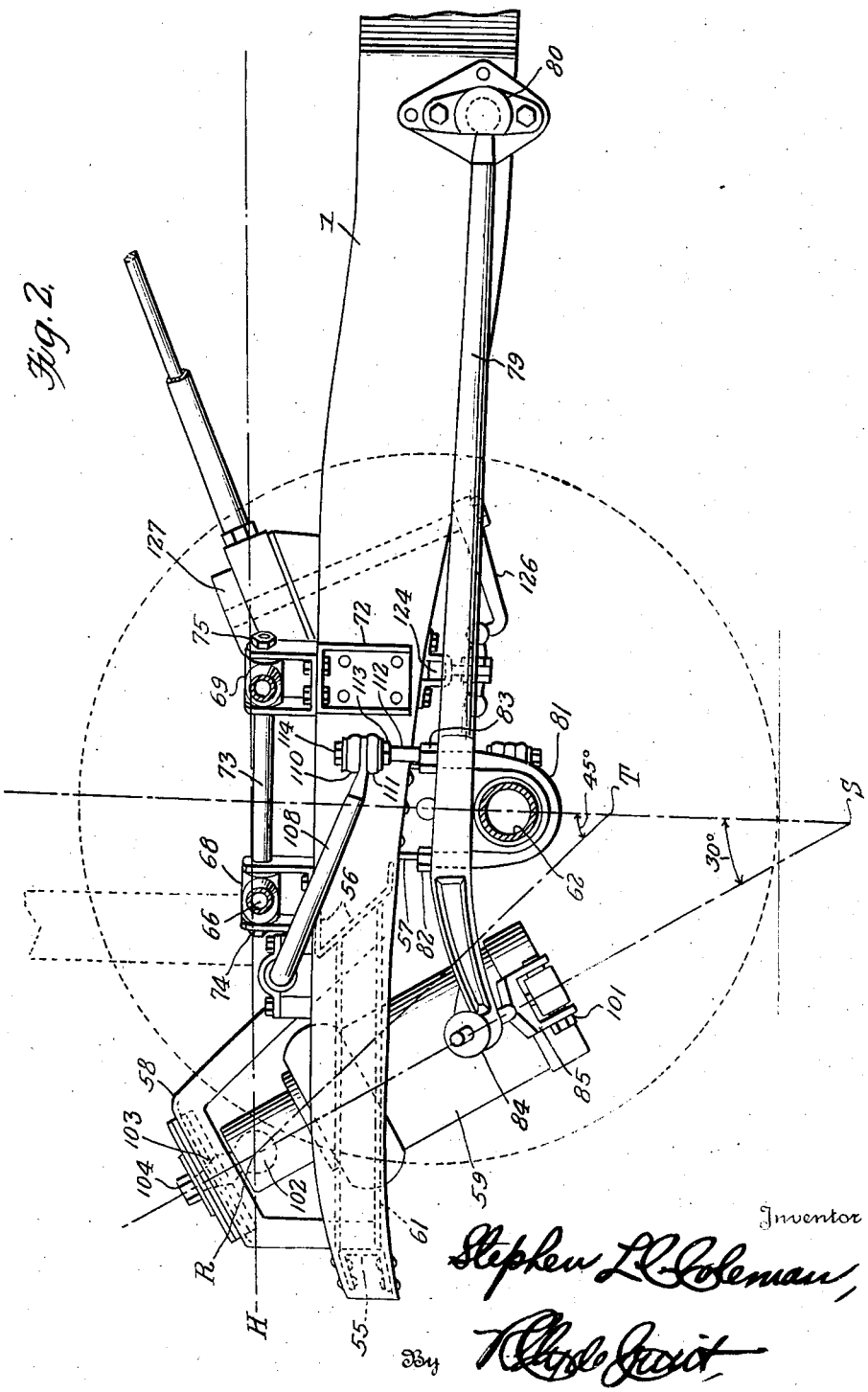

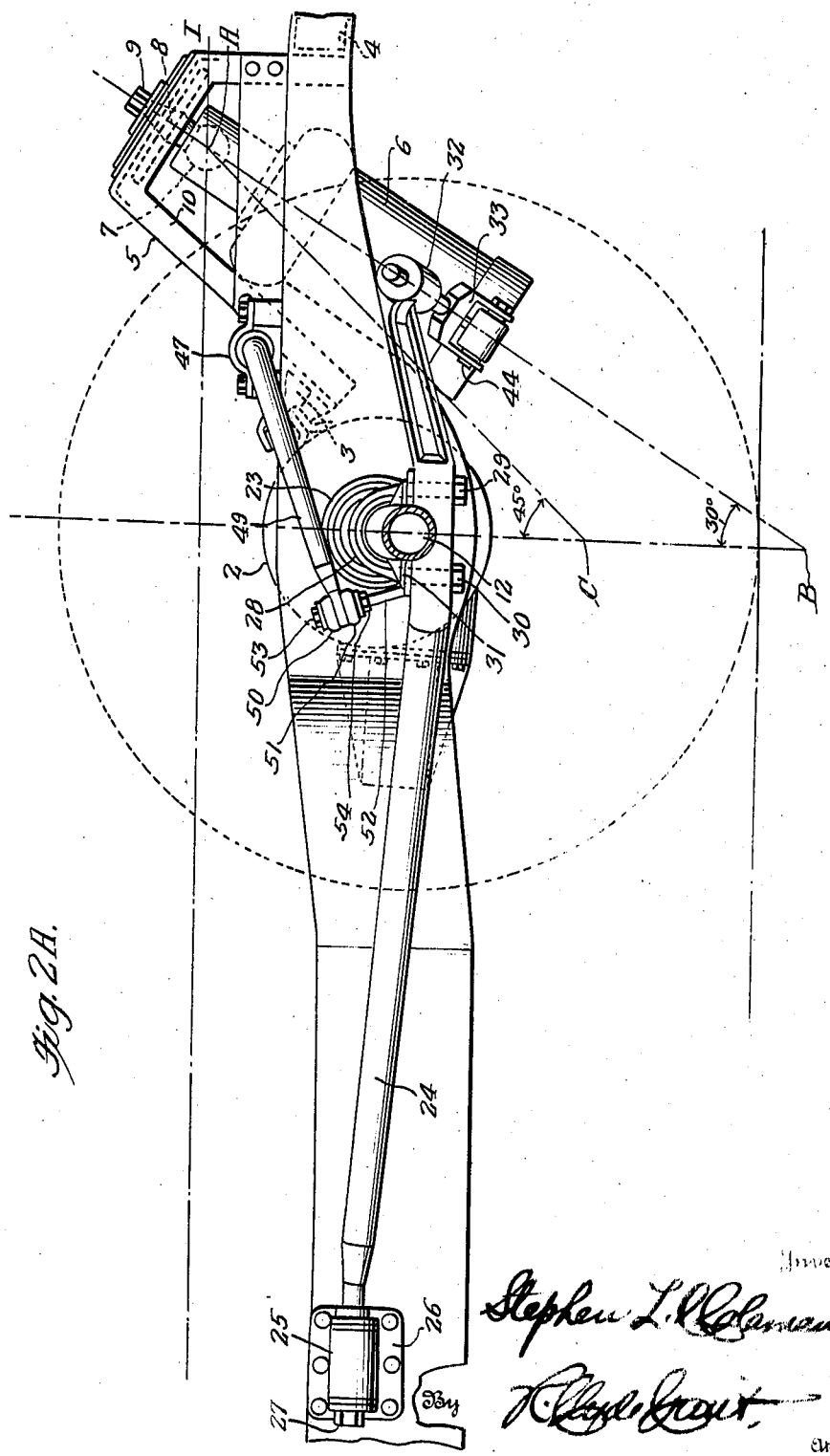

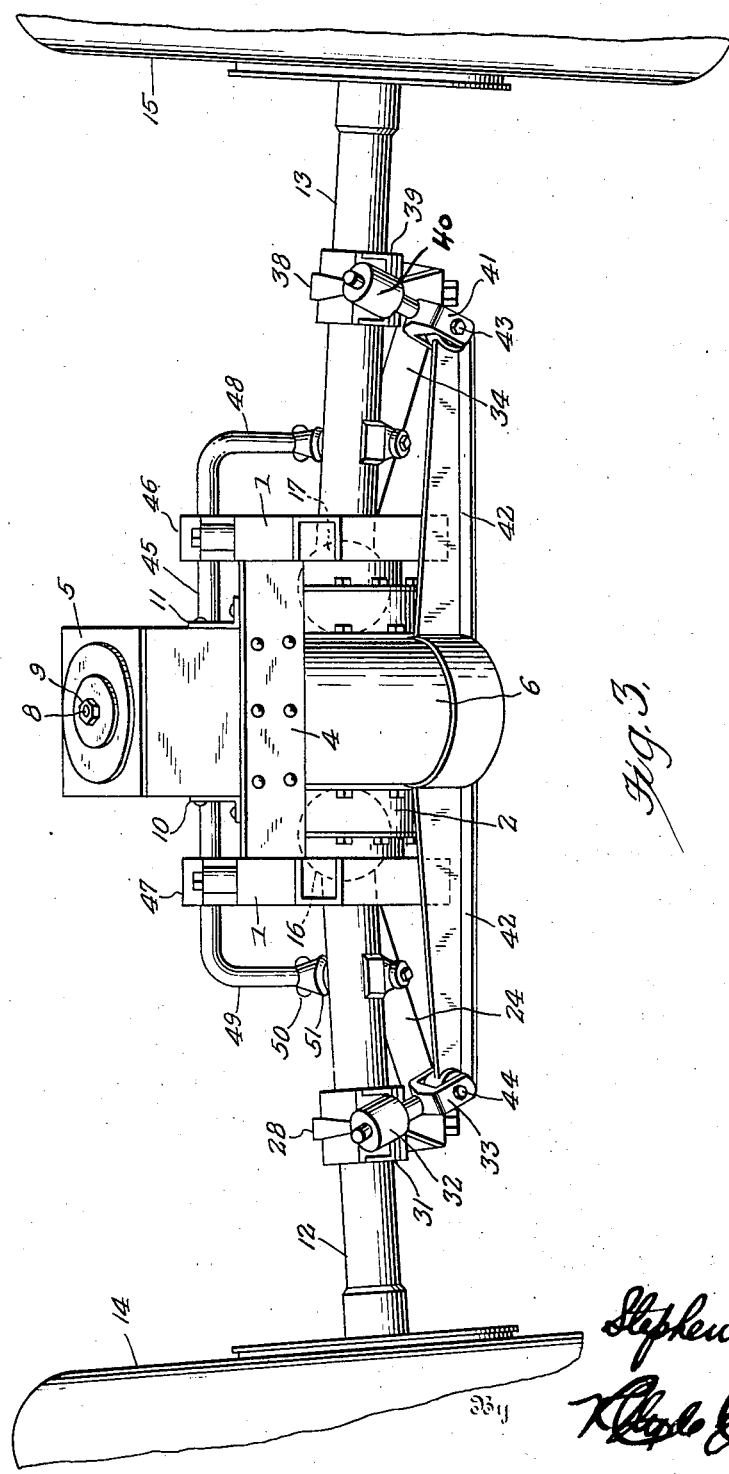

July 6, 1937. S. L. C. COLEMAN 2,085,738
VEHICLE SUSPENSION
Filed Oct. 11, 1935 14 Sheets-Sheet 6
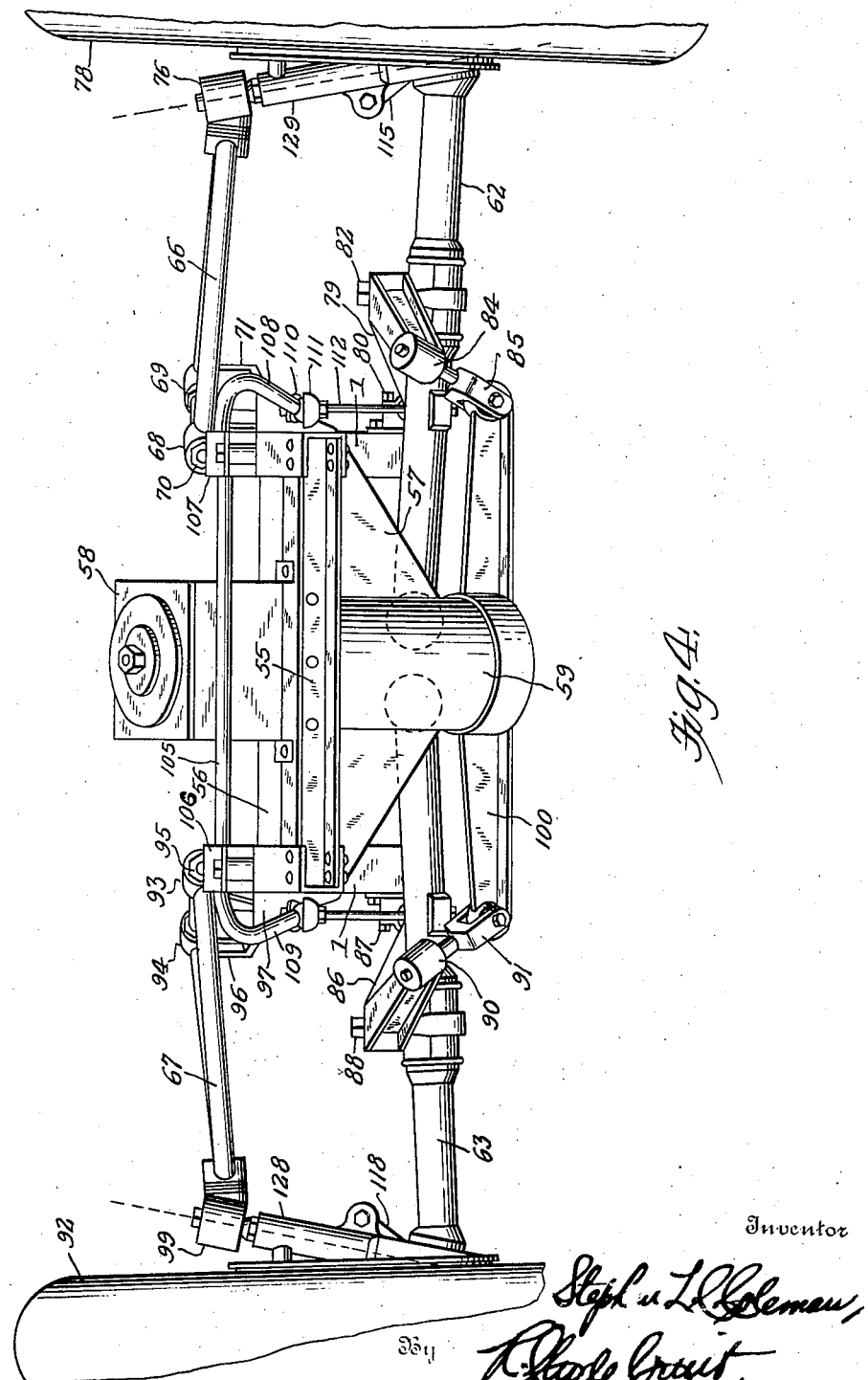
Inventor
Steph. L.C. Coleman,
By R. Lloyd Grist,
Attorney July 6, 1937.  S. L. C. COLEMAN  2,085,738
VEHICLE SUSPENSION
Filed Oct. 11, 1935   14 Sheets-Sheet 7
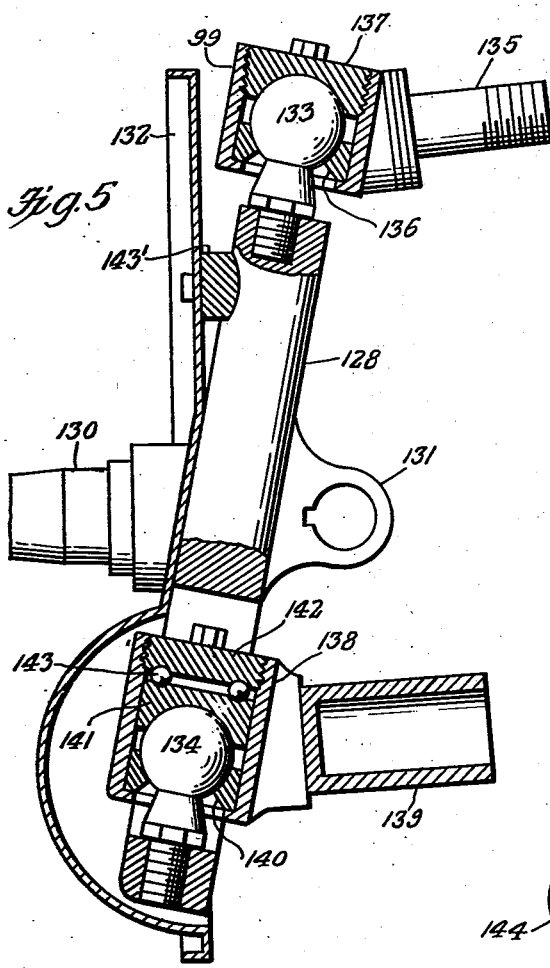
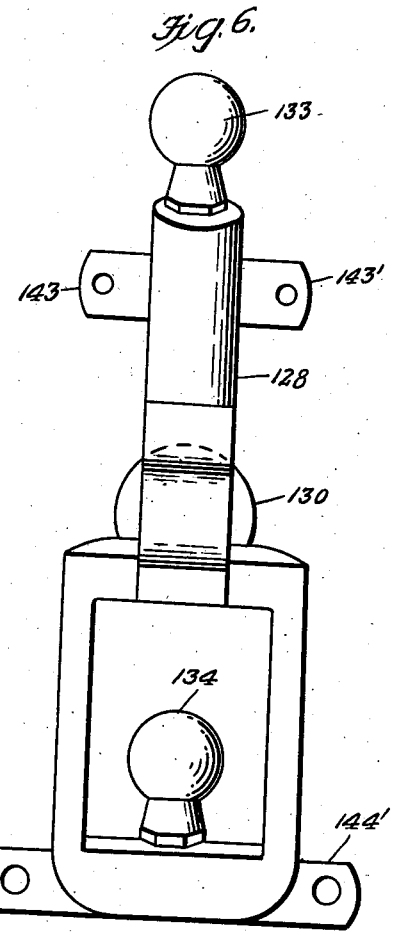
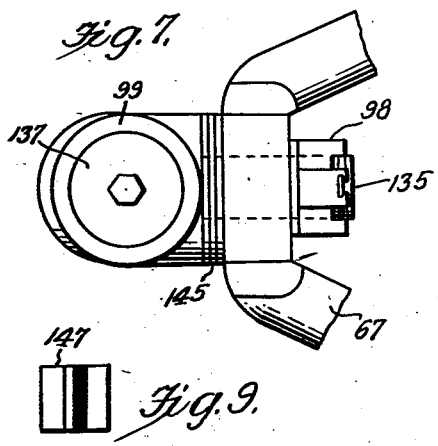
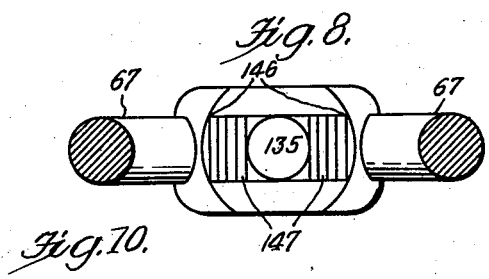

July 6, 1937.  S. L. C. COLEMAN  2,085,738
VEHICLE SUSPENSION
Filed Oct. 11, 1935  14 Sheets—Sheet 8
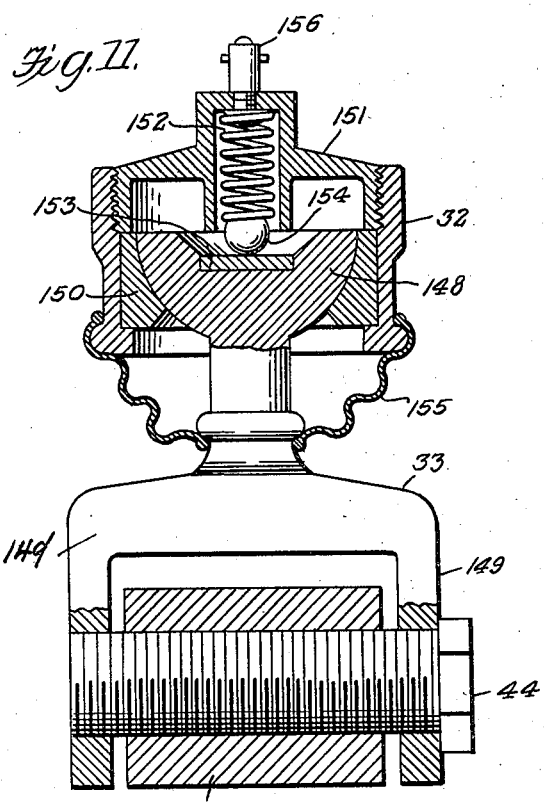
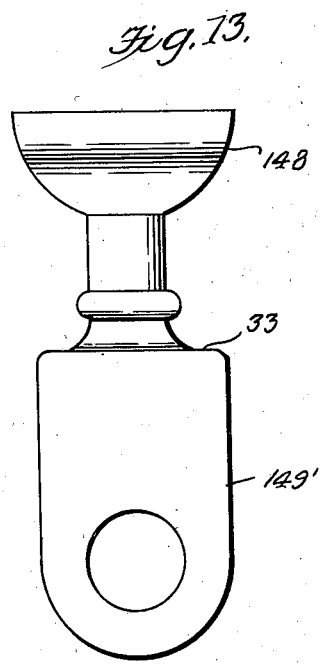
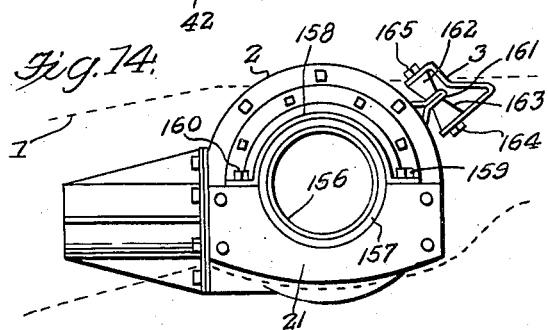
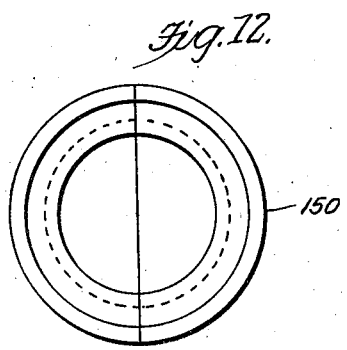
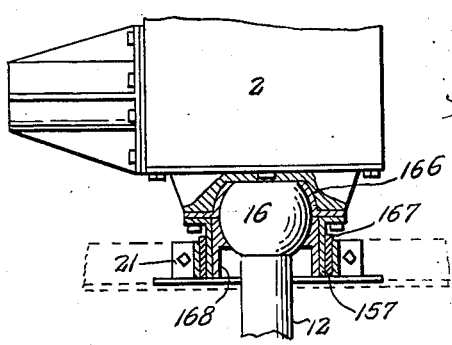

July 6, 1937.   S. L. C. COLEMAN   2,085,738
VEHICLE SUSPENSION
Filed Oct. 11, 1935   14 Sheets-Sheet 9
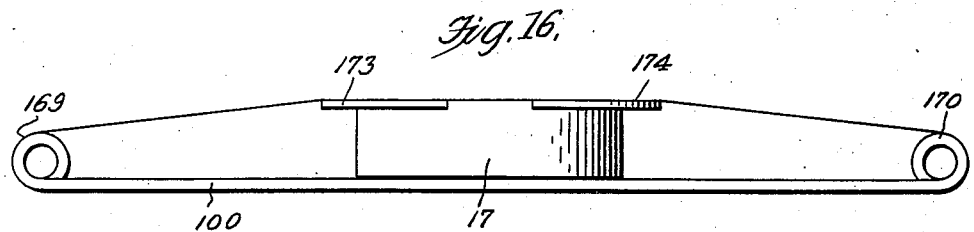
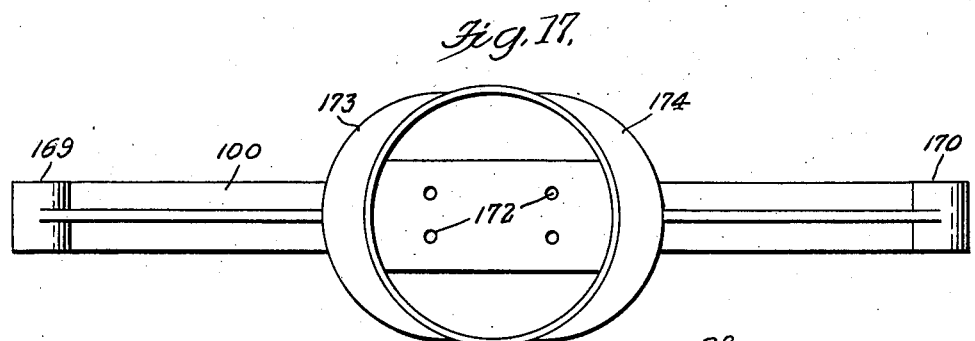
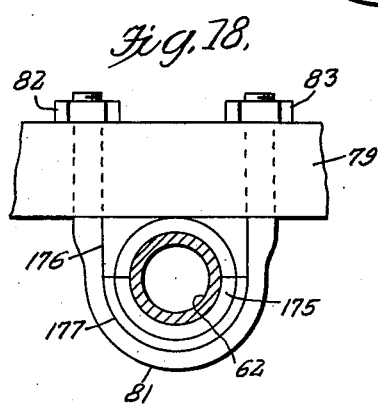
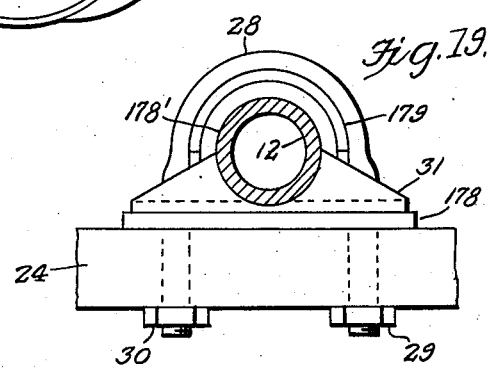
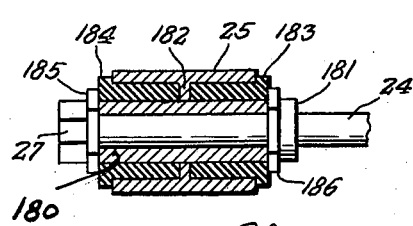
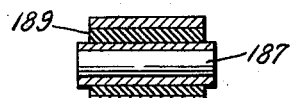

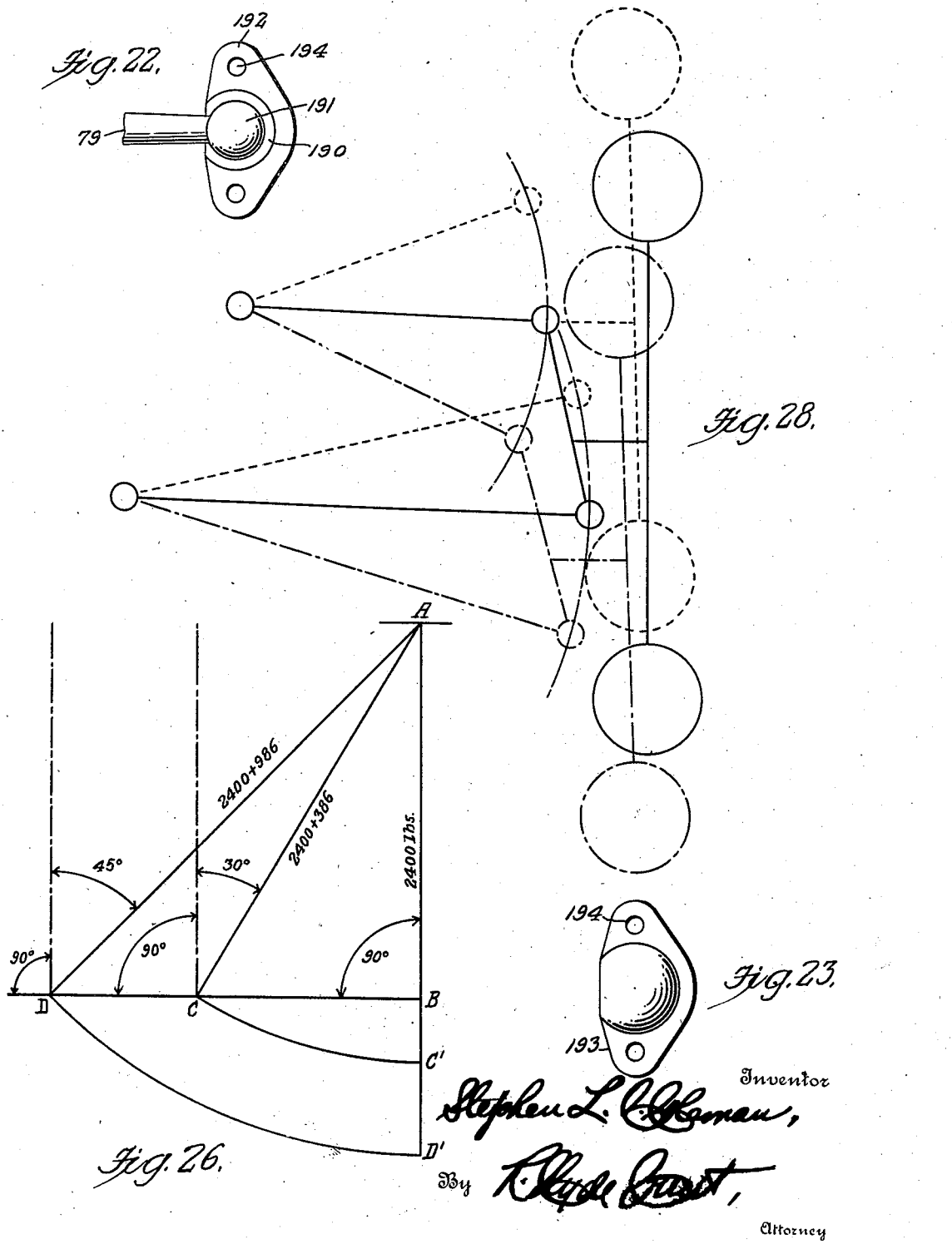

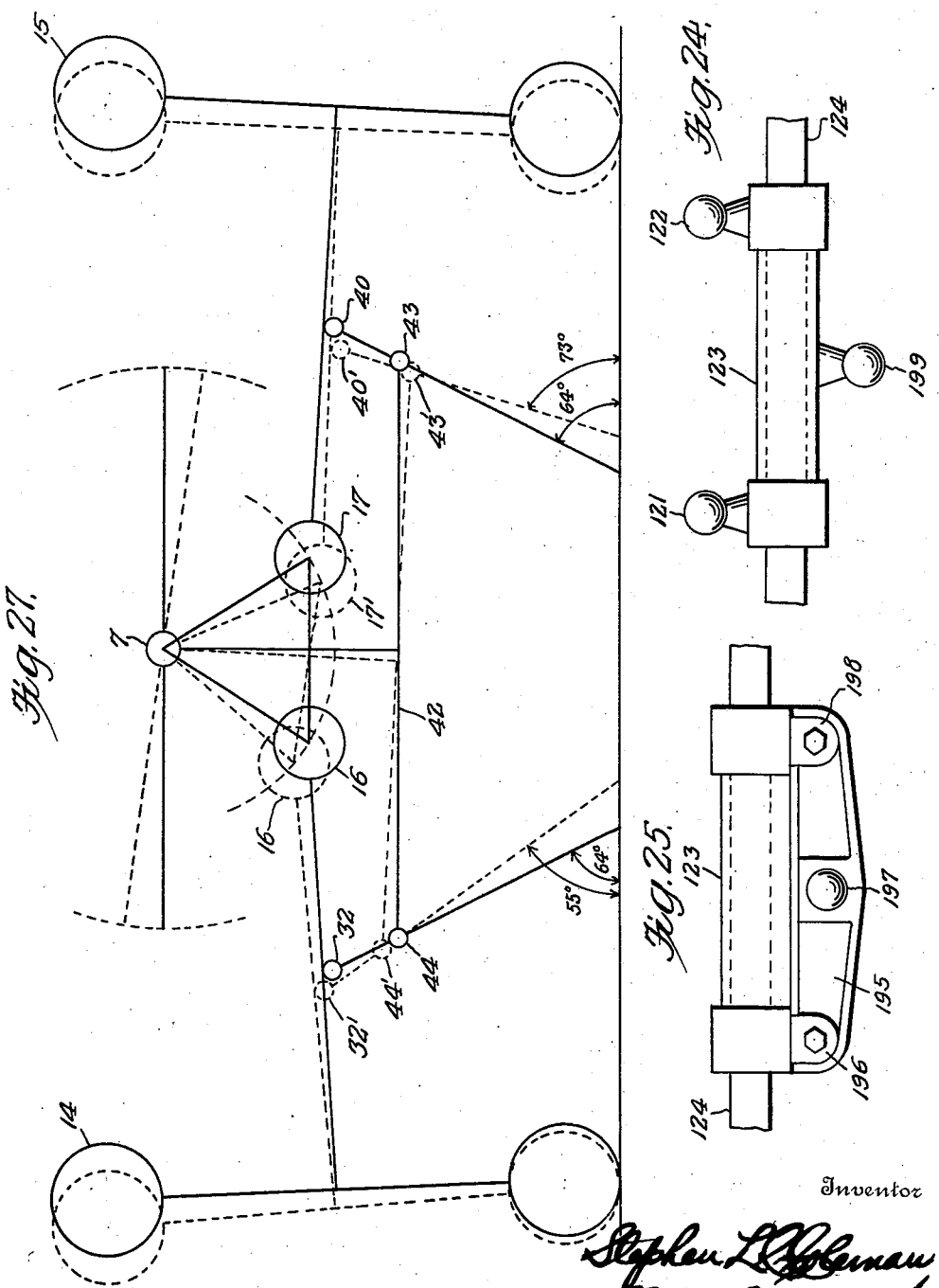

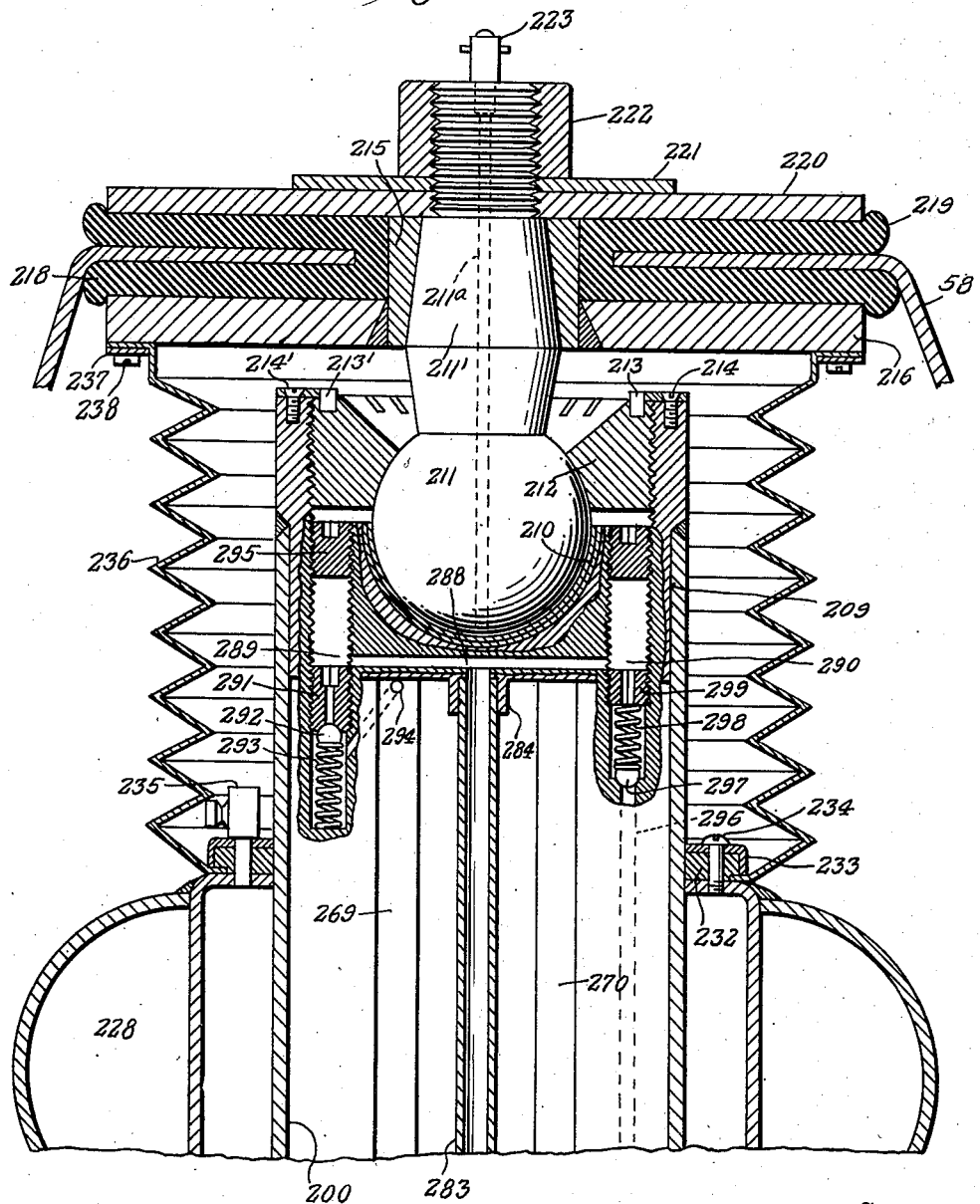

July 6, 1937.  S. L. C. COLEMAN  2,085,738
VEHICLE SUSPENSION
Filed Oct. 11, 1935  14 Sheets—Sheet 14

Inventor
Stephen L. Coleman,
By R. Clyde Grant,
Attorney

Patented July 6, 1937

2,085,738

UNITED STATES PATENT OFFICE 2,085,738

VEHICLE SUSPENSION

Stephen L. C. Coleman, Fredericton, New Brunswick, Canada

Application October 11, 1935, Serial No. 44,615

31 Claims. (Cl. 280—124)

This invention relates to chassis construction and particularly certain improved and novel features applicable to spring suspensions of the same general broad principles as set forth in applicant's Reissue Patent No. 18,177 dated September 8, 1931, and copending applications Serial No. 691,231 filed September 27, 1933, and Serial No. 745,463 filed September 25, 1934.

The object of the invention is to decrease the weight of the chassis, and consequently the cost, while at the same time greatly increasing the stiffness of the chassis frame against twisting and road strains, all tending toward more comfortable driving and riding.

Another object is to produce a construction which will make it practical to substitute light air springs or the like, in place of the comparatively heavy coil and leaf springs now used in conventional constructions.

Another object is to combine with said air springs, as a unit, hydraulic shock absorbers and rebound checks, thus eliminating the four separate hydraulic shock absorbers usually found on automobiles.

Another object is the production of a construction having inherent stability apart from the effect of springs or stabilizing devices.

Another object is to combine independently sprung dirigible wheels, with an air spring suspension for the sprung parts of the chassis.

Another object is to secure a construction in which the great bulk of the load is carried on two centrally disposed pivotal points, one at each end of the chassis, yet permitting the moving of the engine far enough ahead to approximately make an equal load on the front and rear springs without undue lengthening of the chassis.

Further advantageous features of the present invention reside in a greater increase in flexibility under one wheel action, elimination of heavy twisting strains in the frame and body, a great increase in both flexibility and stability, better traction, equal resistance against rolling at the front and rear of the vehicle, reduced unsprung weight, perfect geometry in the steering linkage, increased turning lock, and reduced rise and fall of the body under acceleration or deceleration. In addition there is obtained good insulation against high frequency vibration and noise, and there are no metal springs to break or squeak, the conventional outward appearance being retained, with greater comfort and safety for the passengers, at low cost of production.

Generally stated, the improved spring suspension comprises front and rear air or fluid pressure springs, each mounted at the center of a light rigid T sectioned equalizing member placed transversely to the frame, each equalizing member having an eye formed at both of its ends. These equalizing members are flexibly connected to the running gear, by shackles having a pivot pin joint at their lower ends, and a ball and socket joint at their upper ends.

As shown in the present form, each air spring or the like, comprises telescoping sections, the bottom section being fixed to the center of the equalizing members by studs while the top telescoping section is connected by a ball joint to the frame at its longitudinal center line. Each air spring is preferably arranged at an angle to the vertical plane in such a way that the angle increases under spring stroke. The front and rear spring suspensions are identical.

The frame of the chassis is what is generally called the backbone type. In it the front end of the frame is forked wide enough to accommodate the engine. Back of the engine the side rails of the frame are brought together and welded, and at the rear end of the frame the side rails again form a fork in which is mounted the differential.

In combination with the air springs are two spring steel torsion rods arranged transversely of the frame, one near the front end and the other near the rear end of the car. These torsion rods are each mounted in free bearings on the frame, a considerable section of the ends of each torsion rod being bent in the same direction at approximately right angles to the main body of the torsion rods thus forming lever arms, and the outer ends of these lever arms are flexibly connected through a link and rubber bearings, one to each section of the divided axles.

The running gear at the front end of the car is of a type known as "The Parallelogram", formed of parallel levers hinged to the car frame, and connected pivotally at their outer ends by a vertically disposed lever. In the present instance this latter lever also acts as the king pin and as adopted in this design, the parallel levers are of different lengths. The novel feature of this running gear is the arrangement of the torque arms, and the king pins.

The running gear at the rear of the car is of the type known as "The Pendulum Axle." Here again the novel feature lies in the torque arms and the running gear at both the front and rear ends of the car allows independent wheel action.

The differential is mounted in a novel manner with rubber insulation and torque control, which permits a limited amount of rotation, thus cushioning the engine and gears against shock.

Hydraulic shock absorbers and rebound checks are built into combination with each of the air springs, and a divided steering linkage is used with a transverse sliding carriage, giving perfect geometry.

The preferred embodiment of the invention is illustrated in the accompanying drawings, in which Figures 1 and 1A comprise a plan view of the complete assembly;

Figures 2 and 2A comprise a view in side elevation partly in section of Figure 1 and 1A respectively;

Figure 3 is a rear end elevation of Figure 1A, showing the location of the air spring and its supporting equalizing lever, together with the two axle housing tubes which are pivotally connected to the differential by the ball joints as shown in dotted lines, and the torsional stabilizer mounted on the frame and flexibly connected to the running gear;

Figure 4 is a front end elevation of Figure 1, showing the arrangement of the parallel levers and king pins, the air spring with its equalizing bar, the torque arms supporting the equalizing bar, and the torsional stabilizer with its connections;

Figure 5 is a view partly in elevation and partly in section of the combination king pin and vertical link of the parallelogram of the front end running gear;

Figure 6 is a view of the king pin proper taken at right angles to Figure 5, other parts being omitted;

Figure 7 is a plan view of the housing for the upper ball joint illustrated in Figure 5, showing the method of connecting the top parallel lever of parallelogram;

Figure 8 is a side view of Figure 7 with the nut removed showing the caster adjustment shims in place;

Figure 9 is a side view of the adjustment shims shown in Figure 8;

Figure 10 is an end view of one of the shims shown in Figure 9, illustrating the interlocking projection on each shim;

Figure 11 is a vertical sectional view, partly in elevation of the ball and socket joint and pivot pin shackle construction, used in connection with the air springs;

Figure 12 is a plan view of the two part socket supporting the ball and link shown in Figure 11;

Figure 13 is a side elevational view of the ball and link, of the shackle construction as illustrated in Figure 11;

Figure 14 is a side elevation of the differential case, showing the method of suspension and the rubber insulation therefor;

Figure 15 is a plan view partly in section of Figure 14;

Figure 16 is a view in elevation of one of the equalizing bars adapted to support the air springs;

Figure 17 is a plan view of Figure 16;

Figure 18 is an end view of the rubber bushed joint, used to connect the front end torque arms to the axles;

Figure 19 is an end view of the construction used to connect the rear end torque arms to the rear axles;

Figure 20 is a vertical sectional view of the type of rubber bushing used to connect the front axles to the frame, and also for connecting the inner ends of the rear torque arms;

Figure 21 is a sectional view of the rubber bushing used at the inner ends of the upper parallel levers at the front end of the car;

Figure 22 is a view of the ball and socket rubber insulated joint used at the inner ends of the front end torque arms;

Figure 23 is a cap piece for the joint in Figure 22;

Figure 24 is a plan view of the sliding carriage for the steering linkage;

Figure 25 is a side elevation thereof;

Figure 26 illustrates diagrammatically, the effect of the angular mounting of the air springs;

Figure 27 is a diagram illustrating the theory of inherent stability of the complete assembly;

Figure 28 is a diagram illustrating the movement permitted the front wheels by the parallel levers;

Figures 29 and 29A illustrate enlarged detail vertical sectional views taken on a line through the center, of the air spring and hydraulic check;

Figure 29A:
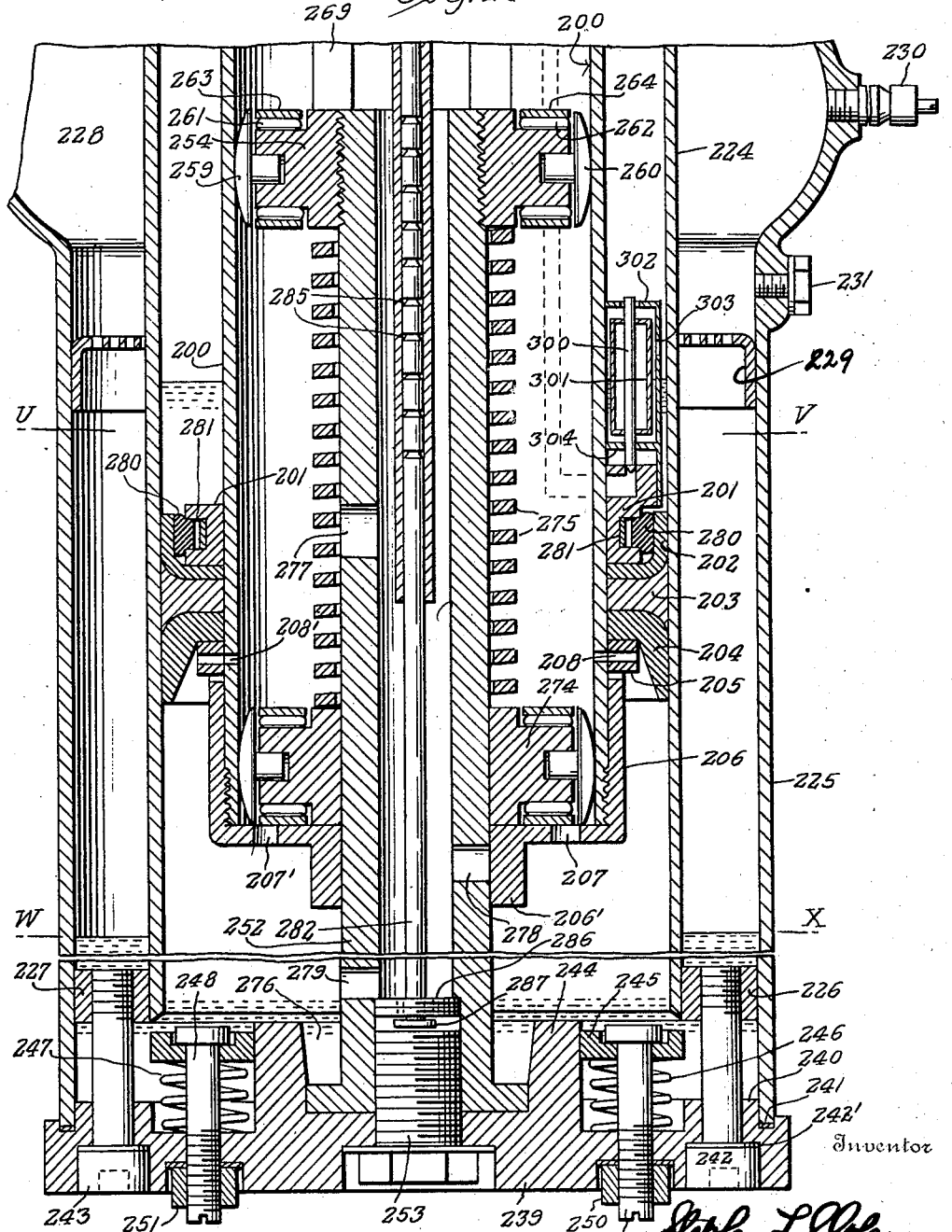

Referring to the drawings in detail the present invention comprises a main frame or back-bone 1 provided with forwardly and rearwardly extending side rail members 1'. These side rail members are fork-like extensions diverging from the main frame and for the greater portion of their length parallel, as clearly shown in Figures 1 and 1A. This main frame 1 is preferably constructed of two inwardly facing channel members brought together at their intermediate portions and welded, providing a rectangular tube at said intermediate portion through which the drive shaft passes.

The forward rail members 1' are spaced far enough apart to permit the placing of the engine and gear box (not shown) between them, and the rear side rail members 1' are likewise spread apart to provide sufficient space for mounting the differential case 2, both the front and rear side rail members 1' having a "kick-up" over the front and rear axles as in accepted practice. Connecting the rear forks of the frame are cross members 3 and 4, riveted or otherwise secured to the side rails of the frame and to these cross members is firmly riveted the flanged plate 5 which is bent at correct angles to form a suitable anchorage for the air spring 6 (see Figure 2A). The air spring 6 is flexibly connected to the frame plate 5 by a ball and socket joint, a socket being provided in the top of air spring 6 to receive a ball joint 7 having a shank 8 passing through plate 5 and secured by a nut 9. This connection is rubber insulated and will be fully described later herein. Flanged plates 10 and 11 are riveted to members 5, 3 and 4 to stiffen the entire assembly.

The rear running gear consists of axle housing tubes 12 and 13, on the outer ends of which are rotatably mounted road wheels 14 and 15, the inner ends of said axle tubes 12 and 13 terminating in large hollow ball joints 16 and 17 mounted in sockets formed in opposite sides of the differential case 2. Inside of the hollow ball joint 16 is a universal joint, connected at one end to the differential, and at the other to a live axle inside tube 12 (not shown), the outer end of the live axle being connected to, and driving a wheel 14. This construction is conventional. The construction of the drive on the opposite side, inside of 17 and 13 is the same as just described and 18 and 19 are the usual universal joints connecting the ends of the drive shaft 20 to the differential and engine. The differential case 2 is hung between the side rails of the frame and is supported on brackets 21 and 22 inside the side rails of the frame, and is rubber insulated as will be described later herein. The axle housing tubes 12 and 13 pass through holes in the side rails 1—1 of the frame, one of these holes being shown at 23 in Figure 2.

Torque rod 24 is pivotally connected at its inner end to the frame by bearing 25, mounted on bracket 26 and is secured in the bearing by nut 27. Bearing 25 is rubber bushed as will be described later herein. Torque rod 24 passes under the axle tube 12 at a point half way between the center of the wheel 14 and the ball joint 16, and is secured to the axle tube 12 by U clamp 28 which straddles tube 12 passing down through holes in the torque arm 24, and fastened by nuts 29 and 30. Axle tube 12 is prevented from rotating by bracket seat 31 welded fast to axle tube 12. This connection between the torque arm 24 and axle housing tube 12 is also rubber insulated to be described later herein. The rear end of the torque arm 24 projects a considerable distance back of the axle tube 12 and terminates in a cup like housing 32 in which is hung ball jointed shackle 33, to be hereinafter described in detail. On the opposite side of the frame the construction is exactly the same, providing a torque arm 34 pivotally connected at its inner end to the frame by bearings 35 mounted on bracket 36 and is secured in the bearing by nut 37. This bearing 37 is also rubber bushed similar to Figure 20 to be later described in detail. Torque arm 34 passes under the axle tube 13 at a point half way between the center of the wheel 15 and ball joint 17 and is secured to the axle tube 13 by U clamp 38 which straddles tube 13 and passes down through torque arm 34, and is fastened thereto by two nuts threaded on the ends of U clamp 38. Axle tube 13 is prevented from rotating by a bracket seat 39 welded fast thereto. This connection between the torque arm 34 and axle housing tube 13 is also rubber insulated. The rear end of the torque arm 34 projects a considerable distance back of the axle tube 13 and terminates in a cup like housing 40 in which is hung a ball jointed shackle 41 described in detail later herein. A rigid T-shaped bar 42 is pivotally connected at its ends by bolts 43 and 44 to shackles 41 and 33, and is fastened at its center by studs to the bottom of the air spring 6. The detail construction of bar 42 will be given in more detail later. It will be noted that air spring 6 is mounted at an angle of 30 degrees to the vertical plane in normal position along the line A, B, and under a full upward stroke of the wheels reaches an angle of 45 degrees along the line A, C, for a purpose to be hereinafter more fully explained.

A round spring steel torsion rod 45 is mounted on top of the frame in bearings 46 and 47 which are rubber bushed and a considerable length of each end of the torsion rod is bent forward in the same direction to form lever arms 48 and 49. The ends of these lever arms are flattened to provide a seat for rubber pads 50 and 51, one placed above and the other below the flat section on the end of lever arm 49. A hole is formed through the center of the flattened section at the end of lever arm 49 and corresponding holes through the center of the rubber pads 50 and 51 through which is passed a connecting link 52, a metal washer being placed on top of rubber pad 50 and one below rubber pad 51, the entire assembly being adjusted to the proper position and pressure by nuts 53 and 54 threaded on the link 52. The hole in lever arm 49 is considerably larger in diameter than link 52, and therefore, there is no metal to metal contact. This same type of rubber joint is used to connect the bottom end of link 52 to a bracket welded to axle tube 12, and the same type of rubber joint is also used at the other side of the chassis to connect arm 48 to axle tube 13.

The hinge axis on which road wheel 14 swings up and down is along the dotted line D, E, and the hinge axis on which road wheel 15 swings up and down is along the dotted line F, G. It will be noted that these hinge axles D, E, and F, G, are parallel to the longitudinal center line of the chassis H, I.

At the front end of the chassis are cross members 55, 56 and 57, securely riveted to the side rails 1—1 of the frame. The cross member 56 serves as a seat for the radiator core and 57 dips low enough to form an anchorage between its flanges for the divided axles. Brace members 57' and 57² are provided to stiffen cross member 57. A flanged plate 58, bent at correct angles forms a suitable anchorage for the air spring 59 and is riveted at its ends to cross members 55 and 56. This assembly is reinforced by flanged plates 60 and 61 riveted fast to cross members 55, 56 and 57.

The running gear at the front end of the chassis consists of divided tubular axles 62 and 63, the inner ends of which being pivotally connected to cross member 57 by bolts 64 and 65. Cooperating with axles 62 and 63 are upper parallel V-shaped levers or links 66 and 67, the two inner ends of said link 66 being pivotally connected to the frame by rubber bushed bearings 68 and 69. These bearings are mounted in U-shaped brackets 70 and 71, the bracket 70 being bolted fast to the side rail 1 of the frame, while bracket 71 is bolted to frame bracket 72 which is in turn riveted fast to side rail 1. A spacing tube 73 is arranged between brackets 70 and 71, and 74 is a long bolt passing through bracket 70, bearing 68, spacing tube 73, bracket 71, and bearing 69, and is pulled up tight by a nut 75 threaded on the end of said bolt 74. The outer end of V lever 66 is connected to a cup 76 which has an integral shaft passing through 66 and secured by nut 77. The outer end of axle 62 and cup 76 at the end of lever 66 are flexibly connected together through a vertical link or king pin, and the king pin has a spindle integral with it, on which is mounted road wheel 78 free to rotate.

The details of the king pin and of the connections at the ends of 66 and 62 will be described later herein.

A torque arm 79 is flexibly connected at its inner end to the side rail 1 of the frame by a rubber insulated ball joint 80, projecting forwardly and crossing over the top of axle tube 62 to which it is connected by a U-shaped clamp 81 embracing tube 62 from below and having its two ends passing through holes in torque arm 79 and secured by nuts 82 and 83. This joint between axle tube 62 and torque arm 79 is rubber bushed and permits some rotation, the details of which are to be more fully described later. Torque arm 79 projects a considerable distance in front of axle tube 62 and terminates in a cup like housing 84, in which is socketed ball joint shackle 85.

The hinge axis of the lower parallel lever formed by the assembly of tube 62 and torque arm 79 is along the dotted line J, K, and the hinge axis of the upper parallel lever 66 is along the dotted line L, M, and it will be noted that these two axes J, K, and L, M, are parallel to each other.

The running gear on the opposite side of the frame is exactly the same as that just described. Here the bottom link of the parallelogram is formed by the axle tube 63 provided at its inner end with a rubber bushed pivoted bearing hung on bolt 65 and held in exact position by torque arm 86, the inner end of said torque arm 86 being flexibly connected to the side rail 1' of the frame by a rubber bushed ball and socket joint 87. Torque arm 86 passes over axle tube 63 and is secured thereto by a U clamp embracing tube 63 and passing through torque arm 86. The ends of this clamp are fastened by nuts 88 and 89 and this connection between torque arm 86 and axle tube 63 is provided with a rubber bushed bearing which permits a limited rotation. The torque arm 86 projects forwardly a considerable distance beyond axle 63 and terminates in a cup like housing 90, supporting a ball jointed shackle 91.

The upper two armed V-shaped link 67 forming the top parallel lever or linkage of the parallelogram controlling the road wheel 92, has at its two inner ends, rubber bushed bearings 93 and 94, by means of which it is pivotally connected to the frame. Bearing 93 is hung in a U-shaped bracket 95 bolted fast to the side rail 1 of the frame and bearing 94 is similarly hung in a U-shaped bracket 96, fastened to and supported by a bracket 97 riveted to the side rail 1 of the frame. The outer end of lever 67 has attached to it by means of a shank and nut 98, a cup shaped housing 99, provided with adjustable means for camber and caster, the details of which will be hereinafter described. The outer ends of the two parallel levers 63 and 67 are flexibly connected to a vertical link which also serves as a king pin permitting turning of the road wheel for steering. The king pin is provided with a spindle or stub axle on which the road wheel 92 is rotatably mounted in the usual manner.

Connected by bolts 101 to shackles 85 and 91 is a T sectional rigid bar 100, said bar being provided at each end with an eye for this purpose.

Mounted at the center of bar 100 and fastened thereto is an air spring or the like 59, said spring being flexibly connected by means of a ball joint 102 socketed in the top of air spring 59, to frame plate 58, said ball 102 having an integral shank 103 by which it is secured in place by a nut 104, this connection being rubber insulated in a manner to be explained hereinafter.

The hinge axis of the lower parallel lever, formed by the assembly of 63 and 86, is along the dotted line N, O, while the hinge axis of the parallel lever 67, is along the dotted line P, Q, the axes N, O, and P, Q, being parallel.

The air spring 59, like the one at the rear of the chassis, is in its normal position, placed at an angle of 30 degrees to the vertical plane, and lies along the dotted line R, S, and under full upward stroke of the road wheels reaches an angle of 45 degrees to the vertical plane, along the dotted line R, T. This has an important effect and function to be explained in more detail later.

Still referring to the forward end of the suspension, a round spring steel stabilizer or torsion rod 105 is mounted on the frame in rubber bushed bearings 106 and 107 bolted fast to the side rails 1—1 of the frame, a considerable portion of each end of the torsion rod 105 being bent in the same direction providing lever arms 108 and 109. The ends of these lever arms are flattened to form seats for two rubber pads 110, 111 (Fig. 2), and a round steel washer is placed on top of pad 110 and another below pad 111 through all of which is passed a vertical link 112 secured by two nuts 113 and 114 threaded on said link 112 to properly position and tension the flexible rubber joint, the diameter of the hole in the arm 108 being greater than the diameter of link 112, there is no metal to metal contact between these members. The joint at the bottom of link 112 connecting it to the axle tube 62, is of exactly the same construction and the method of connecting arm 109 on the opposite side of the chassis to axle tube 63 is identical with that just described.

A steering arm 115 has one end fastened to the king pin 129 and spindle on which the road wheel 78 is mounted and its other end serves as a mounting for a ball joint 116 by means of which it is flexibly connected to tie rod 117. On the opposite side of the chassis, steering arm 118 has one end fastened to the king pin 128 and spindle on which road wheel 92 is mounted, and its other end serves as a mounting for a ball joint 119 by means of which it is flexibly connected to tie rod 120. The inner ends of tie rods 117 and 120 are flexibly connected by ball joints 121 and 122 to the carriage 123 slidably mounted on a square rod 124, this rod 124 being clamped at its ends to the bottom of side rails 1—1 of the frame. The carriage 123 is moved back and forth on rod 124 by a drag link 125 connected at its inner end by a ball joint, to carriage 123 and at its outer end by a similar ball joint to a pitman arm 126 which arm in turn is actuated by a steering gear 127. In the normal straight ahead position of the front road wheels, the ball joint 121 is located in both planes on the hinge axis J, K, and ball joint 122 is located in both planes on the hinge axis N, O.

Figure 3 is a rear end view of Figure 1 in elevation, showing from a different angle the various parts already described.

Figure 4 is a front end view of Figure 1 in elevation, showing from a different angle the various parts already described. In this latter view the pairs of parallel levers 67, 63 and 66, 62 are shown in their relative positions and the king pins 128 and 129 are clearly shown in this figure.

Figure 5 is an enlarged detail view partly in section, of one of these king pins, in which 128 is the main vertical body of the king pin, 130 a part of the wheel spindle, 131 a lug by means of which the steering arm is attached to the king pin, 132 the flanged brake plate, and 133 and 134 are ball joints with integral shanks by means of which they are threaded into the ends of the king pin. A ball joint housing 99 carried by the ball 133 is attached by means of an integral shank 135 to the upper parallel lever 67 shown in Figure 4, and an annular bearing 136 is placed in the bottom of housing 99 and retained therein by an inwardly extending flange formed around the bottom of the housing. Screwed into the top of housing 99 is a threaded plug 137 which serves as an adjustment for the ball and socket joint, a socket being formed in the bottom of plug 137 to fit the ball 133 as clearly shown in Figure 5. The lower end of the king pin supports a cup like housing 138 provided with an integral shank 139 by means of which it is fastened to the outer end of axle tube 63 shown in Figure 4. This housing encloses a ball and socket joint composed of a ball 134 and top and bottom sockets 140, 141 cooperating with a threaded plug 142 screwed into the top of housing 138 providing an adjustment for the ball and socket joint. Between the socket 141 and plug 142 is a ball thrust bearing 143 with races formed in 141 and 142, this thrust bearing greatly reducing friction due to the load on the front end of the car, permitting easy turning of the road wheel for steering.

Figure 6 is a view in side elevation of part 128 shown in detail in Figure 5. Here the rectangular construction of the lower end of king pin 128, to form a seat for ball joint 134, is clearly illustrated, the lugs 143 and 143' being provided to attach brake flange 132 to member 128 and lugs 144 and 144' are used for the same purpose in addition to supporting the brake shoe anchorage bolts. Figure 7 is a plan view of cup 99 of Figure 5, showing method of attaching the same to the upper parallel lever 67, (Figure 4) a fragment of which is shown. The integral shank 135 of cup 99 passes through a slot in lever 67 and is locked in place by nut 98 (Figure 1). A series of shim washers 145 on shank 135 are interposed between cup 99 and lever 67 and serve to adjust the camber of the road wheel by decreasing or increasing their number as desired.

Referring to Figure 8, which is a side view of Figure 7, the bossed end of the V-shaped lever 67 is provided with a rectangular opening 146 through which the shank 135 passes, and on each side of the shank 135 enough shims 147 are placed to completely fill slot 146, adjustment of the caster of the king pin 128 is secured by removing some of the shims in slot 146 on one side of shank 135 and putting them on the opposite side. To retain these shims in place they are formed with an offset in their center as shown in Figures 10 and 11 which interlocks them, and the whole assembly is secured by a nut 98 threaded on the shank 135.

The detail construction of the ball jointed shackles (shown in Figures 1 and 1A at 33, 41, 85 and 91) is illustrated in detail in Figure 11 and a description of one will be sufficient in that they are all alike. For the purpose of illustration and detailed description the torque arm shackle link 33, has at its top a half ball 148 and at its bottom a parallel fork with arms 149 and 149', each of these arms having near its lower end a threaded hole to accommodate a threaded bolt 44. Bolt 44 is also loosely threaded through an eye in the end of bar 42, and the latter is free to oscillate on the said bolt 44. A cup 32 previously referred to as being formed on the end of torque arm 24, supports a socket 150 divided in the center to permit its being inserted under ball 148 when the latter is raised to the top of cup 32. A hollow headed cap piece 151 is threaded into the top of cup 32 and is screwed down until it seats firmly on socket 150. Formed in the center of cap 151 is a chamber housing a coil spring 152, which is put under compression when the cap piece 151 is seated. In the top of the half ball 148 is provided a recess in which is tightly seated a hardened plate 153, and a hardened steel ball 154 is seated in the end of coil spring 152 and bears against plate 153, the diameter of the ball 154 being large enough to prevent its complete entry into the coil spring 152 and consequently it transmits the force stored in the spring to the ball joint 148 and keeps it seated on its socket 150 at all times. It will be noted that the parts are so arranged that the center of the small ball 154 is also the center of the half ball 148, permitting free swinging of the latter about this common center. A rubber or fabric cover or boot 155 is placed over the bottom of the ball joint to exclude dirt and retain lubricant, its method of attachment being plainly illustrated. A grease filler fitting is shown at 156.

Figure 14 is a side elevation showing the method of mounting the differential case, while Figure 15 is a plan view partly in detail section of Figure 14. In these two figures the dotted lines 1—1 are the side rails of the chassis frame to which the differential case 2 is secured on each side by flanged cylindrical extensions bolted fast to the differential case. One of these extensions 156 is shown in both figures, and a rubber ring 157 is stretched around the circumference of cylinder 156. Riveted inside the side rail of the frame is a bracket 21 so shaped as to provide a semi-cylindrical seat for the extensions 156 and 157. A curved member 158, semi-cylindrical in shape having right angle lugs at its ends is bolted fast to bracket 21 by bolts 159 and 160. The tightening of these bolts puts pressure on the rubber ring 157 and holds the differential case firmly in position. The construction on the opposite side of the frame is exactly the same, so that the differential case 2 is hung on two rubber bushed bearings, these bearings permitting a certain amount of oscillation under drive torque. To limit the amount of this oscillation, a metal stop 161 is welded fast to the differential case, said stop being placed between the rubber bumpers 162 and 163 mounted on formed seats on cross member 3 and secured thereto by nuts 164 and 165 threaded on studs which are integral with metal plates on which rubber bumpers 162 and 163 are vulcanized.

Referring to Figure 15, details of the axle ball and socket joint are shown partly in section, the hollow ball 16 on the end of the axle housing tube 12 being seated in a socket 166 formed on the side of the differential case. Another annular socket 167 rests against the outer portion of ball 16 and is retained in place by a threaded ring 168, this ring also acting as an adjustment for the ball and socket joint. The axle tube 12 passes through a hole in the side rail 1 of the frame large enough to permit the necessary amount of up and down swing of the axle tube 12 and also large enough to permit entry of the ball 16 and lock ring 168. A fabric or rubber bellows (not shown) would be used to prevent the entry of dirt by being placed around tube 12 and over the hole in the frame side rail and attached in any suitable manner.

Figure 16 is a side view and Figure 17 is a plan view of the front end equalizing bar on which the air spring is mounted. The bar 100 as shown is a T section with formed eyes 169 and 170 at opposite ends. In the center of the T bar 100, a section of the vertical flange is cut away and a ring 171 is welded therein, forming a seat for the air spring on top of the bottom flange of bar 100 and said air spring is secured by studs passing through the four holes 172 screwed into the base of the air spring. Ring 171 is reinforced by two horizontal flanges 173 and 174 welded fast to ring 171 and the vertical flange of the bar 100. The equalizing bar at the rear end of the chassis is identical in construction with that just described.

Figure 18 is a part sectional view of the rubber bushed bearing used to attach the torque arms to the axle tubes at the front end of the chassis. 79 is a section of one of the torque arms, and 62 is a section of one of the axle tubes. Encircling the axle tube 62 is a two piece cylindrical rubber bushing 175, said bushing being held in place by a filler block 176 and a half circular cap piece 177, the whole assembly being secured by a U-shaped clamp 81 straddling the bearing from below and passing through holes in the torque arm 79, its ends being secured by nuts 82 and 83, threaded thereon. The tightening of these nuts puts the necessary compression on the rubber bushing 175.

In Figure 19 is illustrated, partly in section, one of the rubber insulated connections between the rear torque arms and axle tubes. As shown, 24 is a fragment of the torque arm, 12 is a section of one of the rear axle tubes, and 31 is a bracket seat for said axle tube 12, welded to the bottom of said axle tube 12. Inserted between torque arm 24 and bracket 31 is a rubber pad 178 and another rubber pad 178' is placed around the top of tube 12, and covered by a metal cap 179. A U-shaped clamp 28 straddles the axle tube from above and its arms pass down through holes in 31, 178, and 24, and the whole assembly is tightened up and the rubber put under pressure by nuts 29 and 30 on the threaded ends of clamp 28. As the holes in bracket 31 are larger in diameter than the arms of clamp 28 there is no metal to metal contact between torque arm 24 and axle tube 12. The type of rubber bushing used at the inner ends of the rear torque arms 24 and 34 and also at the inner ends of the divided front axles 62 and 63 are illustrated in detail in Figure 20. Here 24 is a section of the torque arm, provided with a nut 27 which tightly clamps spacing tube 180 between itself and a flange 181 formed integrally with the torque arm 24. A cylindrical metal case 25 having an inner annular flange 182 at its intermediate portion forms a part of the bushing construction and the opening formed by said annular flange is of larger diameter than tube 180. When assembling, tube 180 is placed inside the case 25, then cylindrical rubber bushings 183 and 184 are slipped on over tube 180, one over each end, then the rubber is put under compression by tightening nuts 185 and 186 threaded on the ends of the inner tube 180. The outer ends of the rubber bushings are protected by steel washers (not shown) against which nuts 185 and 186 bear. The rubber bushings 183 and 184 are forced against the abutment 182 in case 25, and this enables the bearing to resist heavy end thrusts. Case 25, where it forms a part of the bearing at the inner ends of the rear torque arms, is formed integral with a bracket by means of which it is attached to the main frame (Figures 1 and 2), while at the front end of the chassis the outside case of the bearing is welded fast to the ends of the axle tubes 62 and 63.

Figure 21 is a view in section of the type of rubber bushing used on the inner ends of the upper parallel lever 66 and 67 (Figure 1). The bearing is composed of an inside metal cylinder 187 and an outside metal cylinder 188. Between these two metal cylinders is inserted under heavy pressure a rubber cylinder 189. The pressure on the rubber is great enough to prevent slippage between the rubber and metal cylinders under rotation up to 40 degrees. In mounting, the assembled bearing is pressed into a cylindrical hole in the ends of levers 66 and 67.

Figure 22 is a view of the rubber bushed ball and socket joint, used at the inner ends of the front torque arms 79 and 80 (Figure 1). The rubber bushing 190 is shown in half section, and surrounds ball 191 formed integral with torque arm 79. In the center of the bracket core 192, is formed a half socket to accommodate the ball 191 and bushing 190. These parts are retained in place by a cap piece 193, Figure 23, which is bolted fast to 192 through holes 194. The case 192 provides a bracket by means of which the bearing is bolted fast to the chassis frame.

Figure 24 is a plan view of the sliding carriage used in the divided steering linkage, and Figure 25 is a side view in elevation of Figure 24. 124 is a square sectioned rod on which the carriage 123 slides back and forth, said carriage having a square hole throughout its length through which rod 124 passes with a slidable fit. Formed integrally with the carriage 123 is a downwardly projecting flange 195, provided with three bosses 196, 197 and 198. Each of these bosses is pierced by a tapered hole in which are mounted steel balls 121, 122, and 199 by means of tapered shanks integral with the balls and secured by nuts threaded on the end of each shank. Balls 121 and 122 are used to flexibly connect carriage 123 to the road wheels through tie rods and steering arms, while ball 199 is used to flexibly connect the carriage 123 by a drag link to the pitman arm of the steering gear.

The air spring hereinbefore referred to as being one of the essential features of both the front and rear portions of the spring suspension is illustrated in detail in Figures 29 and 29A, the same being a vertical sectional view through the center of one of these improved air springs. The air spring comprises a metal tube 200 having welded to it at its lower end, a circular flange 201, shaped to support the leather cup packing 202. A metal flange ring 203 is slipped over the end of tube 200 and is interposed between the leather cup packing 202 and a leather cup packing 204 and is shaped to provide support for both of said cup packings, in conjunction with the metal ring 205, slipped over the bottom end of tube 200 and embracing the leather cup packing 204. The lower end of the tube 200 is provided with a metal cap 206 having an internal thread by means of which it is screwed onto a corresponding thread on the outside of the bottom of tube 200. When the cap 206 is screwed up tight, it firmly holds the piston packing assembly 202, 203, 204 and 205 in place, and prevents leakage along the side of tube 200. At the bottom of cap piece 206 is an annular flange 206' which acts as a plunger for a dash pot 276 directly below it in the base of the air spring. Arranged in the bottom of the cap 206 are small ports 207 and 207'. In ring 205 are provided small ports 208 and 208' communicating with a groove cut on the inside of said ring 205 and thus insuring registry with corresponding ports in tube 200.

The top of piston tube 200 is sealed by plug 209 welded thereto, and in the center of said plug is a semi-spherical socket provided with a soft metal lining 210 which seats ball joint 211. An annular socket 212 embraces the top part of the ball 211 and is threaded into the top part of plug 209 which serves to retain the ball in place and furnish adjustment for the ball and socket joint. Socket 212 is locked in adjusted position by means of lugs 213 and 213' which are fitted in slots cut in the top of socket ring 212 and secured to the plug 209 by screws 214 and 214'.

The ball joint 211 has a tapered shank 211', which is seated in a tapered hole in a ring flange 215 welded to a circular plate 216, supported by the frame plate 58 (Figure 1). Between plates 216 and 58 is interposed a circular rubber pad 218, and on top of plate 58 is another circular rubber pad 219 and on top of this is a steel circular plate 220 surmounted by a steel washer 221, the whole assembly being firmly drawn together by a nut 222 threaded on the shank 211'. The hole in plate 58 is larger in diameter than the ring flange 215 of the plate 216 which passes through it. This space is filled with rubber so there is no metal to metal contact between the air spring and frame. There is a duct 211" drilled down through shank 211' and ball 211 and into the top of duct 211" is screwed a grease-gun fitting 223.

Surrounding the tube 200 is a circular steel tube 224 forming the compression chamber in which the piston on tube 200 moves up and down, and surrounding this tube 224 is a circular tube 225 providing the outside case for the complete assembly. The top of the tube 224 is spun over and fits around the piston tube 200 with a very loose fit. The bottom of tube 224 is fixed to the outside tube 225 by six blocks interposed between the two tubes and welded to both of them, and two of these blocks 226 and 227 are shown in section. The top of the outside case 225 is swelled out to form an air reservoir 228, the upper curved-over edges thereof butting against tube 224 to which it is welded. Just below this swelled out portion is a perforated annular plate 229 welded fast to the outside tube 225 and the space between the six blocks similar to 226 and 227 is closed by perforated plates (not shown) welded to the blocks, and the space between these plates and annular plate 229 is filled with brass or copper wool. 230 is an air valve, and 231 an oil filter plug. On top of the tube 224 is a felt dust ring 232, forming a seal between tubes 200 and 224, held in place by a metal flange ring 233 secured by a number of screws or the like 234. 235 is an oil filler, and 236 is a fabric or rubber bellows to exclude dust and dirt. It is secured at its bottom by being placed beneath flanged ring 233 and at its top it is fastened to the plate 216 by means of a metal ring 237 fastened to plate 216 by a number of screws 238.

A circular base plate 239 has formed integral with it, a raised annular flange 240 near its outer circumference over which the outside tube 225 fits. Outside and below flange 240, there is a groove to accommodate a soft metal washer 241. Adjacent this point are six studs passing up through holes in the base plate 239 and screwed into the six blocks welded between tubes 224 and 225. One of these studs 242 is shown threaded into plug 226, and another stud 243 is shown threaded into plug 227. The six studs mentioned combine to pull case 225 down firmly on gasket 241 and seal the joint tightly. Each one of these six studs like 242 has a gasket 242' between its head and the base plate 239 to prevent leakage.

Raised above the body of the base plate 239 to a level with the bottom of tube 224 is an annular flange 244, and cooperating with the upper outer edge of this flange and the lower edge of the tube 224 is a flat annular valve member 245 adapted to close the annular space between these parts. This valve 245 is held up by four coil springs, two of which are shown at 246 and 247, and is guided, and its height governed, by four studs passing down through corresponding holes with a slidable fit, two of these studs being shown at 248 and 249. These studs are screwed into threaded holes in the base plate 239 and their projecting ends have a screw driver slot for adjustment, said adjustments being maintained by lock nuts as shown at 250 and 251.

Figure 30:
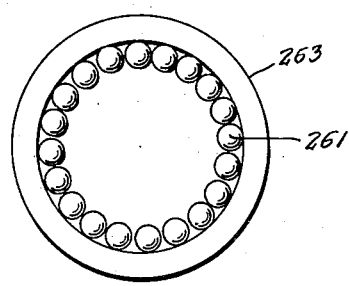
Figure 30 is an end view of needle roller bearing used in connection therewith.
Figure 31:
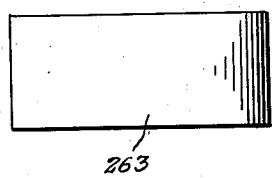
Figure 31 is a plan view thereof.
Figure 32:
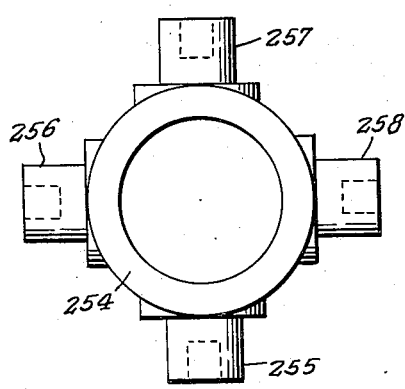
Figure 32 is a plan view of the four armed spider yoke, which carries four of the bearings shown in Figure 30.
Figure 33:
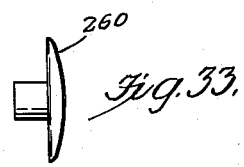
Figure 33 is a side elevation of the cap piece retainer for the needle bearings.

In the center of the air spring is a thick walled tube 252 of comparatively small diameter, the bottom end of said tube being flanged and tightly seated in a cavity in the center of ring 244, and secured by a stout threaded stud 253 passing up through a hole in the exact center of base plate 239, and screwed into a thread on the inside of tube 252, the tube 252 passing, with a loose fit, up through a hole defined by the flange 206' depending from the cap 206. At the top end of tube 252 there is a stout ring 254 threaded onto the outside of tube 252, a plan view of which is shown in Figure 32. Ring 254 has formed integral therewith four projecting stub shafts 255, 256, 257 and 258 placed at equally spaced intervals around its outside circumference, said stub shafts having mounted thereon a needle roller bearing. Figure 31 is a plan and Figure 30 an end view of one of these needle roller bearings, and Figure 33 is one of the cap pieces, each provided with a projection that fits into a hole in the end of each of the stub shafts 255, 256, 257 and 258, and serves to retain the needle rollers in place, all of these bearings being equipped with these cap pieces. Referring back to Figure 29A, 259 and 260 are cap pieces, 261 and 262 are the needle rollers, and 263 and 264 are the outside cases of the needle roller bearings.

Figure 34:
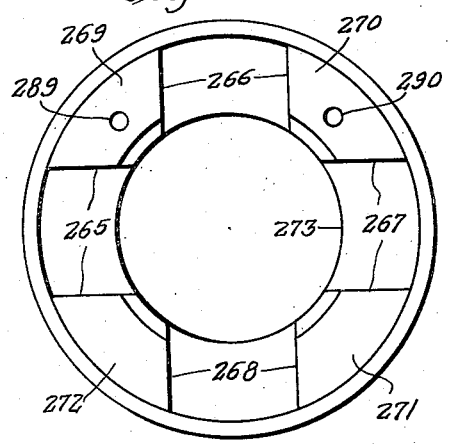
Figure 34 is a plan view of the upper telescoping tube of Figure 29, showing the tracks to accommodate the yoke as shown in Figure 32.

Figure 34 is a plan view of the inside of piston tube 200 below plug 209, illustrating the four channels 265, 266, 267 and 268 forming close fitting tracks for the needle roller bearings mounted on the four stub shafts, 255, 256, 257 and 258 of Figure 32. Between the four channels are four solid abutments 269, 270, 271 and 272 the nose of these abutments are cut back from inside circle 273 which fits the outside of ring 254 (Figure 32) this cut back extends down to a point within two inches of the bottom of tube 200, for the purpose to be explained herein. At the bottom of tube 200 and surrounding tube 252 with a slidable fit, is another ring 274 which is of the same construction as ring 254 previously described, carrying four stub shafts, as in Figure 32, and each stub shaft is equipped with needle roller bearings that closely fit in the vertical channels as illustrated in Figure 34. Surrounding tube 252 and in contact with rings 254 and 274 is a flat wire coil spring 275.

Between the annular flange 244 and tube 252, is a cavity 276 which acts as a dash pot.

Figure 35:
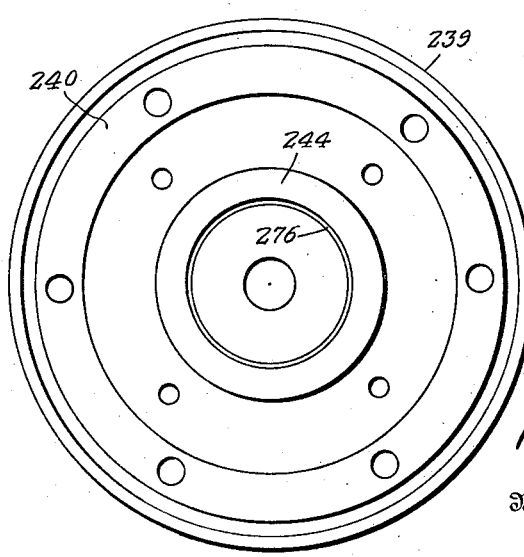
Figure 35 is a plan view of the base plate of Figure 29A.

Figure 35 is a plan view of the base plate 239 illustrated in half section in Figure 29A, showing the holes for the numerous studs previously mentioned. Where studs pass through the base plate leakage is guarded against by using soft metal gaskets under their heads or nuts as the case may be. There are three ports 277, 278 and 279 through the wall of tube 252. All the space in tube 252 and tube 200 is full of oil, and all the space below the piston in tube 224 is full of oil, and there is an inch of oil on top of the piston in tube 224. The level of the oil in the outer chamber when the piston is in normal position is at the dotted line W, X, and is kept there by air pressure in reservoir 228 and under full down stroke of the piston 200 the oil rises to the dotted line U, V. Backing up the leather cup gasket 202, is a circular hard felt ring 280, and back of this is a waved circular steel spring 281.

In the center of the air spring is a reciprocating pump composed of a piston rod 282 acting in the tube 283, mounted in a boss 284 on the bottom center of block 209, this joint being sealed against leakage. Piston rod 282 has a number of shallow sealing grooves 285 at its upper end to increase its efficiency. A threaded plug 286 is screwed into the bottom of tube 252, having a hole in its center of larger diameter than piston rod 282 which passes up through it, said rod having a flanged end 287 of greater diameter than the hole in plug 286 and it is loosely held between plug 286 and stud 253. This construction permits self-aligning of the pump parts.

Associated with the upper end of the tube 283 is a transverse conduit 288 communicating with the interior of pump tube 283 leading at one end into the vertical bore 289 and at the other into the vertical bore 290. A threaded plug 291 with a port through its center is screwed into the threaded bore 289 until it seats below the level of conduit 288. The bottom of plug 291 has a seat to accommodate a steel ball 292 which acts as a valve for the port in the center of plug 291. The ball 292 is held up against its seat by a coil spring 293, and a port 294 connects bore 289 with the interior of tube 200. The top of bore 289 is sealed by a threaded plug 295. A conduit 296 is drilled down through one of the four abutments inside tube 200, connecting bore 290 with the atmospheric pressure chamber between tube 200 and 224.

This same conduit 288 communicates with a conduit 296 provided with a steel ball 297 acting as a valve to close this end of conduit 296. The ball is held against its seat by a coil spring 298, and a threaded plug 299 is screwed down into bore 290 until it seats below the level of conduit 288, plug 299 having a port through its center.

The flow of oil through the mouth of conduit 296 is controlled by a needle valve 300 carrying a metal float 301, said float being enclosed in a metal box 302 fast to the outside of tube 200. This box 302 is oil tight and oil can enter it only through a port 303 set at the height desired for the oil in the chamber above the piston leather cup gaskets.

Needle valve 300 is positioned and guided by being passed, with a loose fit, through box 302 at its top and through partition 304 near its bottom.

The vertical bores 289 and 290 pass down through the head block 209 and into the vertical abutments 269 and 270 inside the tube 200, as also shown in Figure 34.

*Action and advantages.*—Referring to Figures 29 and 29A illustrating the air spring: To prepare the air spring for use it is fully telescoped, and plug 231 and plug 295 are removed, and a charge of dewaxed oil is forced into the interior of the case until it reaches the level of the filler port at 231 which is then closed. A little air pressure is put in the air reservoir 228 through air valve 230, which will force the oil down in the outside chamber and into the piston cylinder (inside tube 224), passing also into tube 252 and tube 200 through port 279. Any air trapped below the leather cup gasket 204 is vented through the small vents 208 and 208', and the chamber 200 is freed of air through the top vent at 294 by depressing ball 292 with a wire through bore 289. As soon as all the air is expelled from the inside tube 200 the oil begins to flow, and the valve 292 is closed. A small quantity of oil is forced in through filler 235 on top of the leather piston gasket 202, which acts as a seal and keeps the leather in good condition. The air spring is then placed in the car and given its maximum static load, after which air pressure is applied through valve 230 until the piston rises to its desired height. The air spring is then ready for service.

In action, when the body falls or the wheels rise to pass over an obstruction, the air spring is telescoped, increasing the pressure in the piston cylinder beneath the piston, some of the oil being forced out of the piston cylinder past valve 245 into the outside chamber, where the rising oil further compresses the air in the top of this air chamber until the air pressure overcomes the pressure of the oil. The shock which caused the telescoping of the air spring, having passed, the air pressure forces the oil back into the piston cylinder and causes the piston to rise to its original position.

In case of a very violent shock, the circular valve 245 being supported on top of coil springs 246 and 247, can recede and increase the valve opening in proportion to the force, thus acting as a safety device. As soon as the oil stops flowing from the piston cylinder into the outside air chamber, the coil springs force the valve 245 up to its set opening. The amount of opening of the valve 245 on the rebound stroke of the air spring is controlled by the studs 248 and 249 and their mates, which studs can be lengthened or shortened between the valve 245 and the base plate by loosening lock nuts 250 and 251 and screwing them in or out. By this means the amount of opening of the valve 245 on the rebound stroke can be set to suit, and controls the speed of flow of the oil and consequently the speed of the rebound stroke.

In any spring suspension in order to secure the utmost softness, it is necessary to eliminate as much friction on the compression stroke as possible, therefore great care has been taken in this air spring to eliminate friction. As stated in the specification where the piston tube 200 passes through the top of piston cylinder 224 it has a very loose fit and there is no metal to metal contact. The telescoping contact is taken by the needle roller bearings mounted on rings 254 and 274 acting between telescoping tubes 200 and 252, resulting in a minimum of friction in these roller bearing contacts and there is no rubbing friction except between the leather cup gaskets and the cylinder wall, and as these contacts are bathed in lubricant, friction is held to a minimum.

If an extremely heavy shock is received forcing a full compression stroke of the piston, the plunger formed by ring 206' enters the dash pot 276 in the base plate and prevents the possibility of a metal to metal contact. Provision is made for a compression stroke of three inches from the normal static position and for an extension stroke of two inches from normal static position. The length of these strokes is doubled at the wheels through the leverages in the hook-up.

It is desirable to keep the bearing points 254 and 274 between the telescoping tubes 200 and 252 as far apart as possible so as to reduce the strain thereon under lateral thrusts. When tube 252 passes upward farther into the tube 200, it will carry the spider ring 274 with it, because there will be more friction between it and tube 252 than there will be between the roller bearings on 274 and the channel tracks on tube 200. On an extension stroke of the air spring from the normal static position, the center tube 252 is drawn further out of piston tube 200, it being free to slide through ring 274, this extension stroke being cushioned and limited by the coil spring 275.

When the spider ring 274 is carried upward by a compression stroke of the air spring, provision has been made to prevent it coming into violent contact with the cap piece 206 on its return stroke. As soon as the port 278 enters ring 206' it is closed, and as the spider ring 274 closely fits the channels in the tube 200 for a distance of two inches from its bottom, a dash pot action is secured. The purpose of the small ports 207, 207' is to prevent vacuum drag holding 274 against cap piece 206 on the compression stroke of the air spring.

In the plan view of the interior of the piston tube 200 as shown in Figure 34, it can be seen how the nose of the four abutments 269, 270, 271 and 272 is cut back, this cut extending down to within two inches of the bottom of the tube, acting as a by-pass to equalize the oil pressure inside tubes 200 and 224, and the ports 277, 278 and 279 serve a like purpose. If the oil were allowed to splash freely in the air chamber, between the outside case 225 and tube 224, it would cause air bubbles to mix in with the oil, and these would be carried by the oil into the piston chamber where the air might interfere with the action of the air spring. To avoid this, the space between 225 and tube 224 below perforated plate 229 is filled with copper or brass wool which prevents the oil from splashing.

The rubber insulated joint at the top of the air spring will be very effective to eliminate high frequency vibration, because of the large area of bearing surface. The unit pressure per square inch is comparatively low, and soft rubber can be used and the ball and socket joint at the top of the air spring precludes the possibility of its being subjected to any heavy destructive twisting stresses. Conditions for lubrication in the ball and socket joint are perfect, because there is no possibility of the lubricant escaping. There are no oil coated surfaces exposed to dust or dirt, the device being completely closed. The possibility of leakage of either oil or air is very remote, and because of the lack of serious friction in the device it should be capable of long and constant service.

Air springs are not new in the automobile trade, having been used for years, but they have certain inherent disadvantages which have prevented very extensive use. The extremely soft action of an air spring is an important advantage if it can be utilized, but this virtue turns into a disadvantage if the air springs are mounted as in conventional practice on the four corners of the frame, because it then destroys stability.

In the instant design the air spring is mounted in the longitudinal center line of the chassis, consequently its extreme softness does not cause rolling. The resistance of a steel spring to flexure is constant, that is, the force required each inch of its travel is the same, but in the air spring it is highly progressive. This fact makes it impractical to have a long stroke air spring and consequently it is the conventional practice, where air springs are used, to combine them with a steel laminated leaf spring. In the present invention, a practical method and apparatus has been evolved to make use of the air spring alone.

Referring to Figure 3, an air spring is shown at 6, mounted on an equalizing bar 42 which is suspended at each end by ball jointed shackles 33 and 41. The ball joints of these shackles mounted in cases 32 and 40 in the ends of the overhanging torque arms, are half way between the wheels and their hinge axis in the center of axle ball joints 16 and 17, consequently, if the wheels are raised six inches in relation to the frame, the ball joints at 32 and 40 will only rise half that amount, or three inches, and this will be the stroke required of the air spring. This leverage mounting of the air spring also doubles the load carried by the spring and increases the inertia of the load.

In Figures 2 and 2A it is seen that the air springs 6 and 59 supporting each end of the chassis are mounted at an angle of 30 degrees to the vertical plane, and under compression stroke, this angle increases to 45 degrees, the effect of this increased angle being shown graphically in the diagram Figure 26. Here the line A, B, represents the load on the spring if mounted vertically, and the unit of time required for its return to normal position after a compression spring stroke. When the spring is mounted at an angle of 30 degrees to the vertical plane and its force acts along the line A, C, then the increased length of the line A, C, over the line A, B, represents the increased load and the increased period of time required for its return to normal position after a compression stroke. When the spring under full stroke assumes an angle of 45 degrees and its stored force acts along the line A, D, to raise the load, then the increased length of the line A, D, over the line A, C, (normal angle in static position) represents the increased load and the increased period of time required for its return to normal position after a compression stroke. With center A and distance A, C, there will be produced the arc C, C', and with center A and distance A, D, the arc D, D', will be produced, whereupon the distance C', D', represents in proportion to the distance A, C', the additional load that has to be raised and the additional time required to do it. It will be noted that it is a very substantial amount approximately 21%. This principle just expounded, by means of which the load is largely increased under stroke, offsets in a great measure the progressive resistance of the air spring which might otherwise make the resistance of the air spring, on the last part of its stroke, too severe.

The action of the air spring can be made very soft on the first part of its stroke, and this combined with its lack of friction would give extremely satisfactory results on pavements, while its increased resistance on the last part of its stroke would prevent bottoming on rough roads, and preclude the necessity of using rubber bumpers.

The built in hydraulic rebound control is very effective because it absolutely controls the force stored in the air springs, and cannot fail to work in any kind of weather and there are no tiny ports to get plugged up or glands to leak. There will be a great reduction in overbounding and afterbounding and no steel springs to break or squeak. Two of these air springs with their built in hydraulic checks can replace four steel springs weighing approximately 125 lbs. and four hydraulic shock absorbers, making a substantial reduction in weight and cost.

There being no pressure on the oil in the atmospheric chamber above the leather cup gaskets, the upper gasket is pushed out and held firmly against the cylinder wall by the waved steel spring 281, the felt ring between the spring and leather gasket serving to distribute the thrust of the spring to the leather gasket.

In order to maintain a constant air pressure under static conditions in the air spring, it is essential that the space occupied by the air remain the same, this in turn requires that the quantity of oil under pressure in the various chambers remain constant.

The leather cup gasket 204 being under heavy pressure, is pressed firmly against the cylinder wall and is highly efficient to prevent leakage past it, but in time some leakage would occur, and to take care of this contingency a reciprocating pump of small diameter is mounted in the center of the air spring, and operates automatically when the air spring telescopes from shocks on the road.

In action, on the suction stroke of the pump, the ball valve 297 opens and allows a charge of oil to be drawn into the pump cylinder. On the up stroke of the pump the valve 297 closes and ball valve 292 is forced open, the oil being discharged through port 294 into the chamber inside the piston of the air spring. In order that the pump will return to the inner chamber only the amount of oil that leaks past the piston gasket, a control valve is mounted at the mouth of the suction bore, and operates as follows.

If leakage past the piston gasket occurs and raises the height of oil in the chamber above the gaskets, the oil when it reaches the height of port 303 will flow into case 302, raising float 301 and needle valve 300. The pump will then suck the oil out of case 302 until the float falls and the needle valve will close and seal the end of suction conduit 296. This prevents the pumping of air into the inner oil chambers and maintains a constant quantity of oil in the inner pressure chambers of the air spring.

Referring to Figures 1 and 1A. The use of a so called back-bone type of frame is particularly well suited to the centrally located spring suspension. This type of frame is much lighter and many times stiffer against weaving than the conventional type of frame, with its many long cross members, which have to be heavy to resist twisting stresses. In the present design there would have to be a few cross members (not shown) attached to the frame, like ribs to support the car body, but as they would only have to have strength in a vertical direction, they could be comparatively light in weight. This reduction in frame weight without sacrificing strength would result in better car performances and reduced cost.

The running gear used in this design has independently sprung wheels both front and rear. At the front end the parallelogram type of running gear is employed. This system can be built in a number of different ways with different effects. For instance, if the parallel levers attaching the wheels to the frame are of equal length, the wheels will remain parallel, but there will be a considerable change in tread width under wheel rise or fall. If the top lever is half the length of the bottom lever, the result will be a constant tread width, but a considerable change in wheel camber under rise or fall of the wheels. Both these movements are objectionable in front wheels. In the instant invention a compromise is effected to reduce both movements to a minimum and this is illustrated in the diagram Figure 28. Here it can be seen that the change of tread and of wheel camber is slight even under a twelve inch wheel stroke.

In order to prevent fore and aft pitching, it is desirable to move the engine ahead over the front axle line, so as to move the center of gravity and with it the pitching axis, forward to the center of the chassis. Provision is made in this design, to mount the engine well ahead, over the cross member to which the front axles are pivoted, without interfering with the air spring. The construction of the front end running gear, with its direct bracing through two torque arms, gives a very strong construction and insures positive location of the wheels, which is important in steering. In conventional practice it is usual to have both a king pin and a vertical link pivotally connecting the two parallel levers of the running gear. In the instant design these two members are combined, as is illustrated in Figures 6 and 7, which simplifies the design and results in fewer joints to permit undesirable movement when wear takes place. The provision for adjustment for camber and caster illustrated in Figures 7, 8, 9, and 10, is also a simplification over conventional practice.

The running gear at the rear end of the chassis also gives independent wheel action, it is the type commonly called pendulum axles. The advantages of this type are, simplicity, two less universal joints, and the wheels both tilt in the correct direction to give security when rounding curves. The drive of the vehicle is taken through the rear torque arms and is cushioned by the rubber joints where the torque arms join the frame. The running gear at the rear end is of very sturdy construction and is so well braced, that the location of the wheels in relation to the frame is positive.

The position and length of the torque arms, in this design will have a decided tendency to reduce up and down oscillations of the frame, under acceleration and deceleration.

In Figures 2 and 2A, it is plainly evident that the load is carried on the two ball joints 7 and 102 on top of the air springs. Because of the overhang beyond the axles of the torque arms which carry the load, there is a reactionary force acting upward to help support the frame at the inner ends of the torque arms. This force acts as a balancing medium, but it only amounts to approximately one quarter of the load, and this being true, the rolling axis of the sprung weight of the car will be on line H, I, passing through the center of ball joints 7 and 102. The rolling axis H, I, of the sprung weight is high enough to pass through or in close proximity to the center of gravity. Consequently there will be no moments around the axis H, I, to cause rolling when rounding curves, due to the action of centrifugal force. If the axis H, I, is placed high enough above the center of gravity, centrifugal force acting on the sprung mass would actually cause the body to lean into the curve instead of outward.

As the bulk of the sprung load of the vehicle is carried on a free bearing axis H, I, along its longitudinal center, approximately the same load is transmitted to the wheels on each side of the vehicle. This will greatly improve the traction and make a safer car to drive. Another effect of this central free axis will be to eliminate heavy twisting stresses in the frame and body.

The mounting of a differential case on the frame of a car presents some difficulty. If the case is solidly mounted it will be noisy and will transmit shock when the engine clutch is engaged. In the present design, care has been taken to avoid these troubles by providing a rubber insulated mounting that dampens out vibration and noise, and which permits a certain amount of oscillation to cushion the drive mechanism.

Referring to Figure 27 this is a diagram to illustrate the reason why the instant design has inherent stability, which tends to keep the body level. The diagram in Figure 27 is founded on Figure 3. If the frame rolls around the load support ball axis 7, the axle ball joint 17 swings to the dotted circle 17', and the other axle ball joint 16 swings to the dotted circle 16'. When this happens the rigid T 7 and 42 (rigid against lateral deformation) formed by the air spring and its equalizing bar, pull the shackles into the positions shown by 40', 43', 32', and 44'. These shackles carry the load and are hung on the overhanging ends of the torque arms causing an upward reaction on the inner ends of these torque arms which are joined to the frame. The original angle of the shackle along the line 40, 43, with the horizontal plane is 64 degrees, while in this new position along the line 40', 43' the angle becomes 73 degrees. This will result in a lesser horizontal component and an increased vertical component of the force acting downwardly on the shackle, this increased vertical force causing a proportional increase in the upward reactionary force on the inner end of the torque arm, which will act to force the frame back to its original position.

On the opposite side of the chassis conditions are reversed. Here the horizontal component of the force acting downwardly on the shackle due to the load, is increased and its vertical component is decreased, with a consequent reduction in the force acting upward on the inner end of the torque arm. This tends to allow the frame to drop back to a level position. At the front end of the chassis the same principles apply and the result is inherent stability, notwithstanding the free central axis on which the load is hung.

Two spring steel torsion rods are employed with this design to take care of out of balance loading, and to prevent rolling of the sprung mass. These torsion rods which are alike and mounted in a similar manner, are shown in Figures 1 to 4 at 45 and 105. Referring to Figure 4, if the frame rolls down one inch at the point 106 around the central load axis H, I, (Figs. 1 to 2) the opposite side of the frame at 107 rises a corresponding amount, creating a thrust upward in arm 108 of one inch and a pull down in arm 109 of one inch, thus forcing a twisting of the torsion rod which is resisted by it. If both wheels rise at the same time, there is a thrust upward in both arms 108 and 109, and the torsion rod turns freely in its bearings offering no resistance. If one wheel say 78 rises one inch there will be only a quarter inch rise at the end of arm 108, because it is connected to the axle 62 at a point one quarter of the distance between the wheel and the inner hinge axis of the axle. Let us assume that the resistance of the torsion rod to movement at one end of one of its arms is 200 pounds per inch of travel, then the resistance to rolling of the frame one inch, will be 2×200 or four hundred pounds, because as previously explained if the frame rolls down one inch, the other side of the frame rises one inch, both arms of the torsion rod are moved one inch in opposite directions, which is equivalent to a two inch movement of one arm only. Under roll, both torsion rods will act similarly so that we have from this source a total resistance against rolling of 2×400 or eight hundred pounds per inch. Under one wheel rise the resistance of the torsion rod will be one quarter of 200 pounds or fifty pounds per inch, but the wheel has a three to one leverage action on the torsion rod, so the resistance at the wheel will be fifty divided by four or twelve and one-half pounds per inch of wheel rise. It is noteworthy that in this design there is equal resistance against rolling at each end of the chassis. This tends to prevent the frame and body from following the front or back wheels, when they pass over a lateral tilt in the road.

In the instant invention the flexibility of the spring suspension overall can be greater than in conventional practice, because the suspension springs are not the medium that controls frame roll in this design.

Referring to Figure 3, the chassis frame is supported by air spring 6, and the rate of this spring is 800 pounds per inch of compression. If the chassis frame falls one inch, point 32 being half way between the road wheel and its hinge axis 16, will fall one half inch, and the point 40 being half way between the road wheel and its hinge axis 17, will fall one half inch. This lowers the equalizing bar and the air spring 6 one half inch, and the spring will be compressed one half inch, notwithstanding the fact that the frame has fallen one full inch. One half inch of 800 is 400 pounds resistance for a one inch frame fall.

If a 200 pound load is placed on the chassis frame, the weight will be equally divided between the two road wheels, giving a downward force of 100 pounds at each wheel. The load transmitted through the spring and its equalizing bar being hung at the points 32 and 40 on the divided axles, and these points 32 and 40 being half way between the road wheels and their hinge points at the frame, it follows that if there is a load of 100 pounds on each wheel, there must be a 200 pound load at 32 and 40, and a 100 pound load at both 16 and 17. Then I have the original load which I placed on the frame of 200 pounds plus 100 pounds at 16, plus another 100 pounds at 17 making a total load of 400 pounds acting on the spring. From the above it is evident that the sprung load doubles, and that the spring is compressed half the amount of frame fall, then with the spring rate 800 pounds per inch of compression, the overall rate for one end of the chassis will be 200 pounds per inch of deflection.

If one wheel 15 is raised one inch, the point 40 will rise one half inch. This will raise the center of the equalizing bar 42 one quarter inch, and compress the air spring 6 that amount. The resistance offered against this movement by the air spring would be one quarter of eight hundred or two hundred pounds. The thrust upward at the wheel acts on the spring through a pair of "two to one" levers, (the axle 13 and the equalizing bar 42) and this reduces the resistance against wheel rise to fifty pounds per inch at the wheel. If I add to this resistance, the resistance offered at the wheel by the torsion rod, I get a total resistance to one wheel rise at the wheel of 50 plus 12½ or 62½ pounds per inch.

To sum the matter up these figures prove a great increase in flexibility and stability in this design of spring suspension over conventional types.

Nearly all the joints in the running gear and spring suspension are rubber insulated, and there being no metal to metal contact between the wheels and frame, high frequency vibration and resonance are greatly reduced.

The ball and socket shackles used at the ends of the equalizing bars 42 and 100 are illustrated in Figures 11, 12, and 13. These shackles give perfect freedom under wheel rise or fall. Their construction is simple, and the lubrication is well taken care of.

There is a considerable reduction in unsprung weight in this design over solid axle types. This is an important point to secure good riding qualities.

After the body and sheet metal work are placed on this chassis it will have an outward conventional appearance. The comfort and safety of the passengers will be enhanced by the design, and the cost will be lowered.

It is to be understood, that the invention is not limited to the specific types of air spring, equalizing bar, stabilizer, or running gear, ball shackles or rubber joints, or to the exact combination and arrangement of these parts as shown, as obviously other arrangements or devices can be used to accomplish the same result. It would be practical to substitute coil springs for the air springs if desired, and the type of running gear at the front end, could be satisfactorily employed at the rear end. Further, although it is preferable to install the suspension on both ends of a vehicle, yet it would work satisfactorily if installed at one end only, with the conventional spring design at the other. This type of spring suspension could also be readily adapted for use on those types of cars which have the frame built into the body.

I claim:

1. In a vehicle suspension, the combination with a frame, of a running gear including front and rear axles, pivotal connections between said axles and frame, an expansible and contractible spring device mounted adjacent one of said axles, means for flexibly connecting said spring device to the frame, means for flexibly connecting said spring device to the axle and means for stabilizing the sprung mass.

2. In a vehicle suspension, the combination with a frame, of a running gear including front and rear axles, pivotal connections between said axles and frame, a front axle expansible and contractible spring device, means for flexibly connecting said spring device to the frame, means for flexibly connecting said spring device to the axles and means for stabilizing the sprung mass.

3. In a vehicle suspension, the combination with a frame, of a running gear including front and rear divided axles, pivotal connections between said axles and frame, a front axle expansible and contractible spring device, means for flexibly connecting said spring device to the frame, means for flexibly connecting said spring device to the axles and means for stabilizing the sprung mass.

4. In a vehicle suspension, the combination with a frame, of a running gear including front and rear axles, pivotal connections between said axles and frame, an expansible and contractible spring device mounted adjacent one of said axles and at the longitudinal axis of the frame, means for flexibly connecting said spring device to the frame, means for flexibly connecting said spring device to the axle and means for stabilizing the sprung mass.

5. In a vehicle suspension, the combination with a frame, of a running gear including front and rear axles, pivotal connections between said axles and frame, the expansible and contractible spring device mounted adjacent the rear axle, means for flexibly connecting said spring device to the frame, means for flexibly connecting said spring device to the axles and means for stabilizing the sprung mass.

6. In a vehicle suspension, the combination with a frame, of a running gear including front and rear divided axles, pivotal connections between said axles and frame, a fluid pressure spring device mounted adjacent one of said axles, means for flexibly connecting said spring device to the frame, means for flexibly connecting said spring device to the axles and means for stabilizing the sprung mass.

7. In a vehicle suspension, the combination with a frame, of a running gear including front and rear divided axles, pivotal connections between said axles and frame, a front axle fluid pressure spring device mounted at the longitudinal axis of the frame, means for flexibly connecting said spring device to the frame, means for flexibly connecting said spring device to the axles and means for stabilizing the sprung mass.

8. In a vehicle suspension, the combination with a frame, of a running gear including front and rear axles, pivotal connections between said axles and frame, an expansible and contractible spring device mounted at an angle to the vertical adjacent one of said axles, means for flexibly connecting said spring device to the frame, means for flexibly connecting said spring device to the axle and means for stabilizing the sprung mass.

9. In a vehicle suspension, the combination with a frame, of a running gear including front and rear axles, pivotal connections between said axles and frame, an expansible and contractible spring device mounted at an angle to the vertical adjacent one of said axles and at the longitudinal axis of the frame, means for flexibly connecting said spring device to the frame, means for flexibly connecting said spring device to the axle and means for stabilizing the sprung mass.

10. In a vehicle suspension, the combination with a frame, of a running gear including front and rear divided axles, pivotal connections betweens said axles and frame, a front and rear axle expansible and contractible spring device mounted at an angle to the vertical, means for flexibly connecting said spring device to the frame, means for flexibly connecting said spring device to the axles and means for stabilizing the sprung mass.

11. In a vehicle suspension, the combination with a frame, of a running gear including front and rear divided axles, pivotal connections between said axles and frame, a rear axle fluid pressure spring device mounted at an angle to the vertical and at the longitudinal axis of the frame, means for flexibly connecting said spring device to the frame, means for flexibly connecting said spring device to the axles and means for stabilizing the sprung mass.

12. In a vehicle suspension, the combination with a frame, of a running gear including front and rear divided axles, pivotal connections between said axles and frame, a front axle air spring, means for flexibly connecting said air spring to the frame, means for flexibly connecting said air spring to the axles and means for stabilizing the sprung mass.

13. In a vehicle suspension, the combination with a frame, of a running gear including front and rear divided axles, pivotal connections between said axles and frame, a front axle air spring, means for flexibly connecting said air spring to the frame at the longitudinal axis of the frame, means for connecting said air spring to the axles and means for stabilizing the sprung mass.

14. In a vehicle suspension, the combination with a frame, of a running gear including front and rear divided axles, pivotal connections between said axles and frame, a front axle air spring, means for flexibly connecting said air spring to the frame at the longitudinal axis of the frame, means for flexibly connecting said air spring to the axles and means for stabilizing the sprung mass.

15. In a vehicle suspension, the combination with a frame, of a running gear including front and rear divided axles, pivotal connections between said axles and frame, a front axle air spring arranged at an angle to the vertical, means for flexibly connecting said air spring to the frame at the longitudinal axis of the frame, means for connecting said air spring to the axles and means for stabilizing the sprung mass.

16. In a vehicle suspension, the combination with a frame, of a running gear including front and rear divided axles, pivotal connections between said axles and frame, front and rear transverse members, pivotal connections between said transverse members and axles and an air spring interposed between each transverse member and said frame.

17. In a vehicle suspension, the combination with a frame, of a running gear including front and rear divided axles, pivotal connections between said axles and frame, front and rear air springs, means for flexibly connecting said air springs to the frame, means for flexibly connecting said air springs to the axles and torsion rods for stabilizing the sprung mass.

18. In a vehicle suspension, the combination with a frame, of a running gear including front and rear divided axles, and expansible and contractible spring devices for said axles, pivotal connections between said axles and frame, radius rods for said front and rear divided axles and torsion rods for stabilizing the sprung mass.

19. In a vehicle suspension, the combination with a frame, of a running gear including front and rear divided axles, and expansible and contractible spring devices for said axles, pivotal connections between said axles and frame, radius rods for said front and rear divided axles, said radius rods being secured to the axles and pivotally connected to the frame and front and rear torsion rods interposed between the frame and axles for stabilizing the sprung mass.

20. In a vehicle suspension, the combination with a frame, of a running gear including front and rear divided axles, pivotal connections between said axles and frame, front and rear transverse members, pivotal connections between said transverse members and axles, air springs for said axles, means for flexibly connecting said air springs to the frame, means for rigidly connecting each spring to its respective transverse member and means for stabilizing the sprung mass.

21. In a vehicle suspension, the combination with a frame, of a running gear including front and rear divided axles, pivotal connections between said axles and frame, front and rear transverse members mounted adjacent the axles, pivotal connections between said transverse members and axles, fluid pressure spring devices for said axles, means for flexibly connecting said spring devices to the frame, means for rigidly connecting each spring device to its respective transverse member and means for stabilizing the sprung mass.

22. In a vehicle suspension, the combination with a frame, of a running gear including front and rear divided axles, pivotal connections between said axles and frame, front and rear transverse members mounted adjacent the axles, pivotal connections between said transverse members and axles, fluid pressure spring devices for said axles, means for flexibly connecting said spring devices to the frame at the longitudinal axis of said frame, means for rigidly connecting each spring device to its respective transverse member and means for stabilizing the sprung mass.

23. In a vehicle suspension, the combination with a frame, of a running gear including front and rear divided axles, pivotal connections between said axles and frame, front and rear transverse members mounted adjacent the axles, pivotal connections between said transverse members and axles, fluid pressure spring devices for said axles, means for flexibly connecting said spring devices to the frame at the longitudinal axis of said frame, means for rigidly connecting each spring device to its respective transverse member, and torsion rods for stabilizing the sprung mass.

24. In a vehicle suspension, the combination with a frame, of a running gear including front and rear divided axles, pivotal connections between said axles and frame, a transverse rigid member mounted adjacent each axle, pivotal connections between said transverse members and their respective axles, a single spring device mounted adjacent each transverse member and rigidly connected at its lower end to said transverse member, a ball and socket joint connection between the upper end of said spring device and the said frame, and means for stabilizing said structure.

25. In a vehicle suspension, the combination with a frame, of a running gear including front and rear axles, one of said axles being divided and pivoted to the frame, a spring device, means for flexibly connecting said spring device to said divided axle, means for connecting said spring device to said frame and means for stabilizing the sprung mass.

26. In a vehicle suspension, the combination with front and rear divided axles, of a unitary frame comprising an intermediate enclosed hollow portion and front and rear fork-like extensions, front and rear unitary fluid pressure spring devices mounted between their respective fork-like extensions by a ball and socket connection between the upper ends of said spring devices and said extensions, a transverse bar rigidly connected to the lower end of each spring device, flexible connections between the ends of said transverse member and their adjacent axles, flexible connections between said axles and frame and torsion rods interposed between said extensions and axles.

27. In a vehicle suspension, the combination with a frame, of a running gear including front and rear axles, pivotal connections between one of said axles and frame, a spring device, means for flexibly connecting said spring device to said pivotal axle, means for connecting said spring device to said frame and means for stabilizing said suspension.

28. In a vehicle suspension, the combination with a frame, of a running gear including front and rear divided axles, pivotal connections between said axles and frame, a rear axle air spring, means for flexibly connecting said air spring to the frame, means for flexibly connecting said air spring to the axles and means for stabilizing the sprung mass.

29. In a vehicle suspension, the combination with a frame, of a running gear including front and rear divided axles, pivotal connections between said axles and frame, a rear axle air spring, means for flexibly connecting said air spring to the frame at the longitudinal axis of the frame, means for connecting said air spring to the axles and means for stabilizing the sprung mass.

30. In a vehicle suspension, the combination with a frame, of a running gear including front and rear divided axles, pivotal connections between said axles and frame, a rear axle air spring, means for flexibly connecting said air spring to the frame at the longitudinal axis of the frame, means for flexibly connecting said air spring to the axles and means for stabilizing the sprung mass.

31. In a vehicle suspension, the combination with a frame, of a running gear including front and rear divided axles, pivotal connections between said axles and frame, a rear axle air spring arranged at an angle to the vertical, means for flexibly connecting said air spring to the frame at the longitudinal axis of the frame, means for connecting said air spring to the axles and means for stabilizing the sprung mass.

STEPHEN L. C. COLEMAN.